United States Patent
Stearns

(10) Patent No.: US 8,826,618 B2
(45) Date of Patent: Sep. 9, 2014

(54) ROOF MOUNT ASSEMBLY

(75) Inventor: Brian Cecil Stearns, Stowe, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 0 days.

(21) Appl. No.: 13/272,005

(22) Filed: Oct. 12, 2011

(65) Prior Publication Data

US 2012/0233958 A1    Sep. 20, 2012

Related U.S. Application Data

(60) Provisional application No. 61/452,983, filed on Mar. 15, 2011, provisional application No. 61/485,693, filed on May 13, 2011.

(51) Int. Cl.
| | |
|---|---|
| *E04D 13/10* | (2006.01) |
| *G09F 7/18* | (2006.01) |
| *E04D 13/14* | (2006.01) |
| *H01Q 1/12* | (2006.01) |
| *E04G 21/32* | (2006.01) |
| *F24J 2/52* | (2006.01) |

(52) U.S. Cl.
CPC .............. *E04D 13/1407* (2013.01); *G09F 7/18* (2013.01); *Y02E 10/47* (2013.01); *Y02B 10/20* (2013.01); *G09F 2007/186* (2013.01); *H01Q 1/1221* (2013.01); *E04G 21/328* (2013.01); *E04D 13/10* (2013.01); *F24J 2/5245* (2013.01)
USPC ................ 52/410; 52/409; 52/411; 52/173.3; 248/237

(58) Field of Classification Search
USPC .............. 52/25, 58, 60, 173.3, 409–411, 698; 248/237; 126/621, 623; 136/244
See application file for complete search history.

(56) References Cited

U.S. PATENT DOCUMENTS

| | | |
|---|---|---|
| 473,512 A | 4/1892 | Laird |
| 756,884 A | 4/1904 | Parry |

(Continued)

FOREIGN PATENT DOCUMENTS

| | | |
|---|---|---|
| CH | 204783 | 5/1939 |
| CH | 671063 A5 | 7/1989 |

(Continued)

OTHER PUBLICATIONS

"Sunmodo Solar Mounting System" Brochure (Available at least as early as Oct. 20, 2011).

(Continued)

*Primary Examiner* — Adriana Figueroa
(74) *Attorney, Agent, or Firm* — Michael Best & Friedrich LLP

(57) ABSTRACT

A roof attachment assembly for mounting to a roof substrate. The roof attachment assembly comprises a plate having a substantially frustoconical protrusion defining an aperture extending therethrough, the plate defining a first surface and a second surface, the first surface facing the roof substrate and the second surface spaced from the roof substrate. The roof attachment assembly also comprises a membrane positioned adjacent one of the first surface and the second surface of the plate, and a bracket positioned proximate the second surface of the plate, the bracket operable to support one or more roof mounted fixtures. The roof attachment assembly further comprises a fastener extending through the bracket, the membrane and the plate, the fastener operable to couple the bracket, the membrane and the plate together, wherein the roof substrate is contiguous adjacent to an end of the fastener.

20 Claims, 23 Drawing Sheets

(56) References Cited

U.S. PATENT DOCUMENTS

| | | |
|---|---|---|
| 1,646,923 A | 10/1927 | Martens |
| 1,925,263 A | 9/1933 | Levow |
| 2,079,768 A | 5/1937 | Levow |
| 2,349,467 A | 5/1944 | Scott |
| D139,568 S | 11/1944 | Hinchman |
| 2,890,664 A | 6/1959 | Rachlin |
| 2,925,976 A | 2/1960 | Martin |
| D188,221 S | 6/1960 | Maro |
| 3,141,532 A | 7/1964 | Runyan |
| 3,182,762 A | 5/1965 | Syak et al. |
| 3,633,862 A | 1/1972 | Breen |
| 3,880,405 A | 4/1975 | Brueske |
| 3,937,121 A | 2/1976 | Schubert |
| 3,998,019 A | 12/1976 | Reinwall, Jr. |
| 4,226,058 A | 10/1980 | Riley |
| 4,269,012 A | 5/1981 | Mattingly et al. |
| 4,321,745 A | 3/1982 | Ford |
| 4,325,178 A | 4/1982 | Pruehs |
| 4,348,846 A | 9/1982 | Bellem |
| 4,367,864 A | 1/1983 | Eldeen |
| 4,404,962 A | 9/1983 | Zinn et al. |
| 4,554,773 A | 11/1985 | Conley |
| D293,203 S | 12/1987 | Hertensteiner |
| D294,904 S | 3/1988 | Bleskachek |
| 4,744,187 A * | 5/1988 | Tripp ............ 52/410 |
| 4,763,456 A | 8/1988 | Giannuzzi |
| 4,778,702 A * | 10/1988 | Hutter, III ............ 428/40.9 |
| 4,796,403 A | 1/1989 | Fulton et al. |
| 4,892,429 A | 1/1990 | Giannuzzi |
| 4,903,997 A | 2/1990 | Kifer |
| 4,927,305 A | 5/1990 | Peterson, Jr. |
| 5,082,412 A | 1/1992 | Thomas |
| 5,127,205 A | 7/1992 | Eidson |
| 5,207,043 A | 5/1993 | McGee et al. |
| 5,217,191 A | 6/1993 | Smith |
| 5,228,248 A | 7/1993 | Haddock |
| 5,353,473 A | 10/1994 | Sherick |
| 5,431,372 A | 7/1995 | Kostelecky |
| 5,483,772 A | 1/1996 | Haddock |
| 5,491,931 A | 2/1996 | Haddock |
| D368,648 S | 4/1996 | Losier |
| 5,528,872 A | 6/1996 | Rotter |
| 5,547,226 A | 8/1996 | Wentworth |
| 5,557,903 A | 9/1996 | Haddock |
| 5,609,326 A | 3/1997 | Stearns et al. |
| 5,613,328 A * | 3/1997 | Alley ............ 52/25 |
| 5,685,508 A | 11/1997 | Smith |
| 5,687,936 A | 11/1997 | Wilson |
| D388,136 S | 12/1997 | Lecocq et al. |
| 5,692,352 A | 12/1997 | Simpson |
| 5,694,721 A | 12/1997 | Haddock |
| 5,715,640 A | 2/1998 | Haddock |
| 5,797,232 A | 8/1998 | Larson |
| 5,813,649 A | 9/1998 | Peterson et al. |
| 5,873,201 A | 2/1999 | Fey |
| 5,882,043 A | 3/1999 | Murphy et al. |
| D409,078 S | 5/1999 | Bolt |
| 5,983,588 A | 11/1999 | Haddock |
| D426,453 S | 6/2000 | Stearns et al. |
| D428,799 S | 8/2000 | Stearns et al. |
| D430,005 S | 8/2000 | Stearns et al. |
| 6,164,033 A | 12/2000 | Haddock |
| 6,193,455 B1 | 2/2001 | Levey |
| 6,354,046 B1 | 3/2002 | Swearingen |
| 6,360,491 B1 | 3/2002 | Ullman |
| 6,414,237 B1 | 7/2002 | Boer |
| 6,453,623 B1 | 9/2002 | Nelson et al. |
| 6,470,629 B1 | 10/2002 | Haddock |
| 6,514,005 B2 | 2/2003 | Shiokawa et al. |
| 6,526,701 B2 * | 3/2003 | Stearns et al. ............ 52/24 |
| 6,536,729 B1 | 3/2003 | Haddock |
| 6,718,718 B2 | 4/2004 | Haddock |
| 6,868,647 B2 | 3/2005 | Poldmaa |
| 6,918,724 B2 | 7/2005 | Eriksson |
| 7,013,612 B2 | 3/2006 | Haddock |
| 7,069,698 B2 | 7/2006 | Nee |
| 7,100,338 B2 | 9/2006 | Haddock |
| 7,174,677 B1 | 2/2007 | Dressler |
| 7,260,918 B2 | 8/2007 | Liebendorfer |
| 7,434,362 B2 | 10/2008 | Liebendorfer |
| 7,600,349 B2 | 10/2009 | Libendorfer |
| 7,686,268 B2 | 3/2010 | Terunuma et al. |
| 7,703,256 B2 | 4/2010 | Haddock |
| D617,174 S | 6/2010 | Schaefer et al. |
| 7,730,901 B2 | 6/2010 | Ball |
| 7,758,011 B2 | 7/2010 | Haddock |
| 7,762,027 B1 * | 7/2010 | Wentworth et al. ........ 52/173.3 |
| 7,789,365 B2 | 9/2010 | Durig et al. |
| 7,857,269 B2 | 12/2010 | Plaisted et al. |
| 7,861,485 B1 | 1/2011 | Wentworth et al. |
| 7,866,099 B2 | 1/2011 | Komamine et al. |
| 7,895,808 B1 | 3/2011 | Wentworth et al. |
| 7,900,413 B2 | 3/2011 | Stanley |
| 7,905,064 B1 * | 3/2011 | Wentworth et al. ........ 52/173.3 |
| 7,935,202 B2 * | 5/2011 | Stanley ............ 156/71 |
| 7,946,082 B2 | 5/2011 | Ohkoshi et al. |
| 7,956,280 B2 | 6/2011 | Kobayashi |
| 7,987,641 B2 | 8/2011 | Cinnamon |
| 8,122,648 B1 * | 2/2012 | Liu ............ 52/58 |
| 8,136,311 B2 | 3/2012 | Lui |
| 8,166,720 B2 | 5/2012 | Garrigus et al. |
| 8,448,405 B2 | 5/2013 | Schaefer et al. |
| 2002/0035811 A1 | 3/2002 | Heuel |
| 2002/0046506 A1 | 4/2002 | Ullman |
| 2002/0088196 A1 | 7/2002 | Haddock |
| 2002/0131842 A1 | 9/2002 | Eriksson |
| 2003/0101662 A1 | 6/2003 | Ullman |
| 2003/0177706 A1 | 9/2003 | Ullman |
| 2004/0173373 A1 | 9/2004 | Wentworth et al. |
| 2006/0010786 A1 | 1/2006 | Rogers |
| 2007/0245636 A1 | 10/2007 | Ayer et al. |
| 2007/0266672 A1 | 11/2007 | Bateman et al. |
| 2007/0289233 A1 | 12/2007 | Haddock |
| 2008/0000173 A1 | 1/2008 | Lenox et al. |
| 2008/0087275 A1 | 4/2008 | Sade et al. |
| 2008/0190047 A1 | 8/2008 | Allen |
| 2008/0245404 A1 | 10/2008 | DeLiddo |
| 2008/0313976 A1 | 12/2008 | Allen |
| 2009/0309388 A1 | 12/2009 | Ellison |
| 2010/0192505 A1 | 8/2010 | Schaefer et al. |
| 2010/0236155 A1 | 9/2010 | Lanza |
| 2010/0307074 A1 | 12/2010 | Stearns et al. |
| 2011/0120047 A1 | 5/2011 | Stearns et al. |
| 2011/0135882 A1 | 6/2011 | Stanley |
| 2011/0138602 A1 | 6/2011 | Stanley |
| 2011/0162779 A1 | 7/2011 | Stanley |
| 2011/0204195 A1 | 8/2011 | Stanley |
| 2011/0240207 A1 | 10/2011 | Stanley |
| 2011/0247279 A1 | 10/2011 | Stearns et al. |
| 2011/0247295 A1 | 10/2011 | Stearns et al. |
| 2012/0017529 A1 | 1/2012 | Shadwell et al. |
| 2013/0298494 A1 | 11/2013 | Corsi |

FOREIGN PATENT DOCUMENTS

| | | |
|---|---|---|
| DE | 3716491 A1 | 12/1988 |
| DE | 3723020 A1 | 1/1989 |
| GB | 666147 | 2/1952 |
| JP | 5-346055 | 12/1993 |
| JP | 8193392 | 7/1996 |
| WO | 2011032134 | 3/2011 |

OTHER PUBLICATIONS

"Tecsun (UL) PV-Wire" Brochure, Prysmian Cables and Systems USA, LLC Brochure, Schletter Inc. (Available at least as early as Oct. 20, 2011).

TileTrac Product Photograph (Available at least as early as Jun. 8, 2011).

"TileTrac Tile Roof Structural Attachment" Brochure, Professional Solar Products, Inc., Copyright Mar. 2011.

UFD (Universal Fastening Disc) Installation Instructions and Design Drawings (Available at least as early as Jul. 14, 2011).

(56) References Cited

OTHER PUBLICATIONS

"Zilla Racking & Mounting Components" Zilla Corporation, Copyright 2011.
"Zilla the King of Racking Racking Systems" Brochure, Zilla Corporation (Available at least as early as Oct. 20, 2011).
"Zilla Zip Flashing Assembly Instructions" Zilla Corporation, Copyright 2011.
"Zilla Zip Single-Bolt Flashing Assembly" Brochure, Zilla Corporation, Copyright 2011.
"Zilla Zip Single-Bolt Flashing Assembly" Zilla Corporation, Copyright 2011.
"AET T6 Pitched Roof PV Rail System" Brochure, Applied Energy Technologies (Available at least as early as Oct. 20, 2011).
Affordable Solar, UniRac PRO-PAK Standard Rail 204", available at least as early as Jan. 9, 2009.
Affordable Solar, Solar Panel Mounts & Solar Trackers for Solar Power Systems, available at least as early as Jan. 9, 2009.
"E-Ton Solar" Brochure, E-Ton Solar Tech. Co., Ltd. (Available at least as early as Oct. 20, 2011).
"Fall Protection in Contruction", OSHA Laws 3146; 1995.
"Genmounts Solar Racking Systems" Brochure (Available at least as early as Oct. 20, 2011).
"Mage Powertec Kits" Brochure, Mage Solar Projects, Inc. (Available at least as early as Oct. 20, 2011).
Non-Final Office Action, U.S. Appl. No. 12/727,726, mailed Sep. 16, 2011.
Non-Final Office Action, U.S. Appl. No. 13/166,378, mailed Sep. 19, 2011.
Non-Final Office Action, U.S. Appl. No. 12/914,209, mailed Sep. 20, 2011.
Non-Final Office Action, U.S. Appl. No. 13/166,542, mailed Sep. 16, 2011.
Omco Solar Brochure (Available at least as early as Oct. 20, 2011).
"Orion Solar Racking Jupiter Series Ground Mount System" Brochure, Orion Solar Racking (Available at least as early as Oct. 20, 2011).
"Phono Solar Tigo Energy Smart Module" Brochure, Phono Solar Technology Co., Ltd. (Available at least as early as Oct. 20, 2011).
"Polar Racking PolaRail Flush Mount Racking System" Brochure, Polar Racking Inc. Brochure, Schletter Inc. (Available at least as early as Oct. 20, 2011).
"PowAR Grip Product Sheet", A Raymond Tinnerman Industrial, Inc. (Available at least as early as Oct. 20, 2011).
Product Advertisement, "Alpine Snowguards/Setting the Industry Standard/Snow Guards for Every Roof Type" Mar. 27, 2000.
Product Advertisement, "Speedstand", Contractors Guide, Jun. 2000.
Product Description—"An Innovative Approach to Zero Roof Penetrations", Portable, Pipe Hangers, Inc., printed Jul. 2000.
Product Description—"Gecko—An Introduction", Gecko Safety Systems, Fall Arrest Protection, printed Jul. 2000.
Product Description—"Instruction and Specification Manual, Super Anchor: Fall Arrest Anchor. ARS-2.times.8 and ARS-2.times.12", 1993.
Product Description—"Super Anchor: Instruction/Specification Manual: Stainless Steel Fall Arrest Anchors ARS 2.times.8, ARS 2.times.12, I-Joist, Moveable ARS, Vertical Wall Anchor, and Custom Anchor", Mar. 2000.
Product Description—Anchor Guardrails, printed Aug. 2000.
Product Description—Gecko—An Introduction, Gecko Safety Systems, Ltd., printed Mar. 2000.
Product Description—Portable Pipe Hangers, Inc., Inter517face, Jun. 2000.
Product Description—Portable Pipe Hangers, printed Aug. 2000.
Professional Solar Products Inc., Fast Jack, available at least as early as Jan. 9, 2009.
Professional Solar Products Inc., FastJack Commercial Fast Jack, Commercial Leveling Kit, Comparison Chart for the Fast Jack, available at least as early as Jan. 9, 2009.
Professional Solar Products Inc., FastJack Installation Manual, modified Sep. 10, 2007.
Professional Solar Products Inc., FastJack Leveling Kits, available at least as early as Jan. 9, 2009.
"Prysmian Cables & Systems Photovoltaic (PV) System Products" Product Sample and Brochure, Prysmian Power Cables and Systems USA, LLC (Available at least as early as Oct. 20, 2011).
"Quick Mount PV" Brochure (Available at least as early as Oct. 20, 2011).
Quickscrews International Corporation brochure (Available at least as early as Jun. 29, 2011).
"Rapid2+ Clamp Product Sheet", Schletter Inc. (Available at least as early as Oct. 20, 2011).
"S-5! CorruBracket" Brochure, Metal Roof Innovations, Ltd. (Available at least as early as Oct. 20, 2011).
S-5! Dirimak Brochure (Available at least as early as Jul. 18, 2011).
S-5! Dirimak Product Photographs (Available at least as early as Jul. 18, 2011).
"S-5! S-5-U and S-5-U Mini" Brochure, Metal Roof Innovations, Ltd. (Available at least as early as Oct. 20, 2011).
"S-5! VersaBracket" Brochure, Metal Roof Innovations, Ltd. (Available at least as early as Oct. 20, 2011).
"Schletter Professional Solar Mounting Systems Mounting and Project Planning" Brochure, Schletter Inc. (Available at least as early as Oct. 20, 2011).
"Solar Power International 11 SPI Daily News—Thursday, Oct. 20, 2011" Solar Power International 2011 (Oct. 20, 2011).
"Solar Security Fasteners" Brochure, Duncan Solar (Available at least as early as Oct. 20, 2011).
"Sunmodo Ez Roof Mount Installation Guide" (Available at least as early as Oct. 20, 2011).
"Sunmodo Ez Roof Mount L Foot for Shingle Roofs" Brochure (Available at least as early as Oct. 20, 2011).
"Sunmodo Ez Mount Standoff for Metal Roofs" Brochure (Available at least as early as Oct. 20, 2011).
"Sunmodo Ez Roof Mount Standoff for Shingle Roofs" Brochure (Available at least as early as Oct. 20, 2011).
"Advanced Roof Protection" Panelclaw, (available at least as early as Feb. 16, 2012), 2 pages.
"CENIQ, Mounting instructions" Instruction Manual, Centrosolar AG, (Oct. 2011), 28 pages.
"Dura-Blok™, A Complete Rooftop Support Solution" brochure, Cooper Industries, PLC, (2010), 16 pages.
"Lightning Rod" drawing sheet, SIKA Corporation, (Apr. 2010), 1 page.
"Lightning Rod at Deck Level" drawing sheet, Thermoplastic Universal, (2012), 1 page.
"Lightning Rod at Deck Level With SecurTape" drawing sheet, Thermoplastic Universal, (2011), 1 page.
"Lightning Rod at Parapet (Vertical Attachment)" drawing sheet, Thermoplastic Universal, (2012), 1 page.
"Lightning Rod Detail" drawing sheet, Duro-Last, (1998), 1 page.
"Nobody Covers You Better" drawing sheets, Firestone Building Products, (Jan. 1, 2006), 6 pages.
"Rooftop Mount" Daetwyler Clean Energy Eco-Top™, (2011-2012), 3 pages.
"Scirocco—an innovative solution for low impact and low ballast flat-roof PV installation" brochure, Sloar Canada Inc. (2010-2011), 2 pages.
"Solar" borchure, Lauren Manufacturing, (available at least as early as Feb. 16, 2012), 2 pages.
"Sunrail Flat Roof Mounting System" brochure, Opsun Technologies, Inc. (2011), 2 pages.
"Zilla Racking & Mounting Components" Zilla Corporation, (available at least as early as Jun. 8, 2009), 4 pages.
International Preliminary Report on Patentability for Application No. PCT/US2012/027798 dated Sep. 26, 2013 (7 pages).
International Preliminary Report on Patentability for Application No. PCT/US2012/033764 dated Jan. 23, 2014 (7 pages).
MacDonald, "Inspecting the Scaffold" and Protective Roofing Products LTD. advertisement (Available at least as early as Oct. 20, 2011), Roofing Contractor 6.00.

(56) References Cited

OTHER PUBLICATIONS

Product Advertisement—Sama, Samafil Division (Available at least as early as Oct. 20, 2011).
Product Description—"Flat Roof Safety System", POHL Roof and Safety Systems, Securant (Available at least as early as Oct. 20, 2011).
Product Description—FLUX-Boy (Available at least as early as Oct. 20, 2011).
International Search Report and Written Opinion for Application No. PCT/US2012/027798 dated Sep. 27, 2012 (8 pages).
Office Action for U.S. Appl. No. 13/270,385 dated Mar. 26, 2012 (7 pages).
Office Action for U.S. Appl. No. 13/270,792 dated Apr. 16, 2012 (10 pages).
Office Action for U.S. Appl. No. 13/271,650 dated Apr. 23, 2012 (13 pages).
Office Action for U.S. Appl. No. 13/271,650 dated Jul. 25, 2012 (12 pages).
Office Action for U.S. Appl. No. 13/272,938 dated Apr. 23, 2012 (11 pages).
Office Action for U.S. Appl. No. 13/272,938 dated Jul. 26, 2012 (8 pages).
Office Action for U.S. Appl. No. 12/914,209 dated Jan. 27, 2012, 5 pages.
Office Action for U.S. Appl. No. 12/727,726 dated Jan. 4, 2012, 5 pages.
Office Action for U.S. Appl. No. 13/270,385 dated Dec. 23, 2011, 7 pages.
Office Action for U.S. Appl. No. 13/270,419 dated Dec. 22, 2011, 7 pages.
Office Action for U.S. Appl. No. 13/271,633 dated Dec. 5, 2011, 7 pages.
Office Action for U.S. Appl. No. 13/272,938 dated Dec. 22, 2011, 9 pages.
Office Action for U.S. Appl. No. 13/270,798 dated Mar. 26, 2012, 9 pages.
International Search Report and Written Opinion for Application No. PCT/US2012/033764 dated Oct. 10, 2012 (8 pages).
MacDonald, "Inspecting the Scaffold" and Protective Roofing Products L TD. advertisement, Roofing Contractor 6.00, (available at least as early as Oct. 20, 2011).
Product Advertisement—Sama, Samafil Division, (available at least as early as Oct. 20, 2011).
Product Description—"Flat Roof Safety System", POHL Roof and Safety Systems, Securant, (available at least as early as Oct. 20, 2011).
Product Description—FLUX-Boy, (available at least as early as Oct. 20, 2011).

* cited by examiner

ROOF MOUNT ASSEMBLY

CROSS-REFERENCE TO RELATED APPLICATIONS

This application claims the benefit of and priority to U.S. Provisional Patent Application No. 61/452,983, filed Mar. 15, 2011, and to U.S. Provisional Patent Application No. 61/485,693, filed May 13, 2011, the entire contents of which are hereby incorporated by reference herein.

FIELD OF THE INVENTION

The present invention relates to roof mounting structures and methods of installing and using the same.

SUMMARY

In one embodiment, the invention provides a roof attachment assembly for mounting to a roof substrate. The roof attachment assembly comprises a plate having a substantially frustoconical protrusion defining an aperture extending therethrough, the plate defining a first surface and a second surface, the first surface facing the roof substrate and the second surface spaced from the roof substrate. The roof attachment assembly also comprises a membrane positioned adjacent one of the first surface and the second surface of the plate, and a bracket positioned proximate the second surface of the plate, the bracket operable to support one or more roof mounted fixtures. The roof attachment assembly further comprises a fastener extending through the bracket, the membrane and the plate, the fastener operable to couple the bracket, the membrane and the plate together, wherein the roof substrate is contiguous adjacent to an end of the fastener.

In another embodiment, the invention provides a roof attachment assembly for mounting a structure to a membrane roof. The roof attachment assembly comprises a pair of opposed compression plates, a first one of the pair of compression plates defining a recess, a second one of the pair of compression plates having an outwardly extending frustoconical protrusion matingly engageable in the recess defined in the first one of the pair of compression plates. The roof attachment assembly also comprises a skirt compressed between the pair of opposed compression plates and substantially shrouding one of the first and second pair of compression plates, and a standoff positioned proximate the pair of opposed compression plates, the standoff operable to support the structure and to space the structure away from the membrane roof. The roof attachment assembly further comprises a fastener extending through the standoff, the skirt and the pair of compression plates, the fastener securing the standoff to the pair of compression plates and compressing the skirt between the pair of opposed compression plates to seal the attachment assembly, and a bond formed between the skirt and a roof membrane secured to the membrane roof.

In another embodiment, the invention provides a roof attachment assembly for mounting a structure to a membrane roof. The roof attachment assembly comprises a clamp having pair of opposing clamp halves, a first one of the clamp halves defining a recess, a second one of the clamp halves having an outwardly extending frustoconical protrusion matingly engageable in the recess defined in the first one of the clamp halves. The roof attachment assembly also comprises a skirt compressed between the pair of opposed clamp halves, and a standoff positioned proximate the pair of opposed clamp halves, the standoff operable to support the structure and to space the structure away from the membrane roof. The roof attachment assembly further comprises a fastener extending through the standoff, the skirt and the pair of clamp halves, the fastener securing the standoff to the pair of clamp halves and compressing the skirt between the pair of opposed clamp halves to seal the attachment assembly, and an elastic pad positioned between the pair of clamp halves and the membrane roof.

In another embodiment, the invention provides a roof attachment assembly for mounting a structure to a roof having a roof membrane. The roof attachment assembly comprises a bracket secured to the roof and operable to support the structure and space the structure away from the roof, and a seal positioned between the bracket and the roof to prevent leakage around the bracket through the roof. The seal includes a clamp having a pair of opposed compression plates and a fastener extending through the bracket and the compression plates, the fastener having a blunt end supported away from the roof membrane. The seal further includes a skirt compressed between the pair of opposed compression plates and substantially shrouding one of the first and second pair of compression plates, a bond formed between the skirt and the roof membrane to substantially enclose one of the first or second pair of compression plates, and an elastic pad positioned between the clamp and the membrane roof to shield the roof membrane from contact with the clamp.

In another embodiment, the invention provides a roof attachment assembly to be mounted on a roof substrate. The roof attachment assembly comprises a base member positioned adjacent to the roof substrate, the base member having a substantially frustoconical protrusion extending away from the roof substrate and defining an aperture, the base member defining a first surface and a second surface, the first surface facing the roof substrate and the second surface spaced from the roof substrate. The roof attachment assembly also comprises a first membrane positioned adjacent the second surface of the base member, the membrane defining a second aperture substantially aligned with the first aperture, a second membrane positioned adjacent the first membrane, the second membrane defining a third aperture substantially aligned with the first aperture and the second aperture, and a fastener extending through the base member and the first membrane. The fastener is operable to engage a supporting element extending through the third aperture.

In another embodiment, the invention provides a roof attachment assembly to be mounted on a roof substrate. The roof attachment assembly comprises a first membrane supportable on the roof substrate, and a base member that defines a first surface positioned substantially adjacent the first membrane and a second surface spaced from the roof substrate and the first membrane. The base member defines a surface area and includes a frustoconical protrusion extending away from the roof substrate along an axis, the first surface forms a frustoconical recess and the second surface forms the frustoconical protrusion. The base member defines a first aperture extending along the axis from the first surface to the second surface, the first aperture substantially centrally positioned in the frustoconical protrusion. The roof attachment assembly also comprises a second membrane coupled to the first membrane and coupled to the base member, and a fastener oriented along the axis, the fastener extending through the first aperture and the second aperture to couple the base member to the second membrane. The second membrane is positioned substantially adjacent the base member second surface, and the second membrane defines a surface area, wherein the second membrane surface area is greater than the surface area of the base member. The second membrane is deformable to substantially conform to the frustoconical protrusion of the base member. The second membrane defines a second aperture extending therethrough, the second aperture being substantially aligned with the first aperture, such that the second aperture extends along the axis.

In another embodiment, the invention provides a roof attachment assembly to be mounted on a roof substrate. The roof attachment assembly comprises a base member supportable on the roof substrate. The base member defines a first surface positioned substantially adjacent the roof substrate, a second surface spaced from the roof substrate, and a surface area. The base member includes a frustoconical protrusion extending away from the roof substrate along an axis, where the first surface forms a frustoconical recess and the second surface forms the frustoconical protrusion. The base member defines a first aperture extending along the axis from the first surface to the second surface, the first aperture substantially centrally positioned in the frustoconical protrusion. The roof attachment assembly also comprises a membrane positioned substantially adjacent the base member second surface. The membrane defines a surface area, wherein the membrane surface area is greater than the surface area of the base member. The membrane is deformable to substantially conform to the frustoconical protrusion of the base member, the membrane defining a second aperture extending therethrough, the second aperture being substantially aligned with the first aperture, such that the second aperture extends along the axis. The roof attachment assembly also comprises a fastener oriented along the axis, the fastener extending through the first aperture and the second aperture to couple the base member to the membrane.

In another embodiment, the invention provides a roof attachment assembly to be mounted on a roof substrate. The roof attachment assembly comprises a first membrane supportable on the roof substrate, and a base member that defines a first surface positioned substantially adjacent the first membrane and a second surface spaced from the roof substrate and the first membrane. The base member defining a surface area and including a frustoconical protrusion extending away from the roof substrate along an axis, the first surface forms a frustoconical recess and the second surface forms the frustoconical protrusion. The base member defines a first aperture extending along the axis from the first surface to the second surface, the first aperture substantially centrally positioned in the frustoconical protrusion. The roof attachment assembly also comprises a second membrane coupled to the first membrane and coupled to the base member. The second membrane is positioned substantially adjacent the base member second surface. The second membrane defining a surface area, wherein the second membrane surface area is greater than the surface area of the base member. The second membrane being deformable to substantially conform to the frustoconical protrusion of the base member, the second membrane defining a second aperture extending therethrough, the second aperture being substantially aligned with the first aperture, such that the second aperture extends along the axis. The roof attachment assembly further comprises a bracket coupled to the second membrane, the bracket defining a first surface spaced from the second membrane and a second surface positioned substantially adjacent the second membrane. The bracket defines an aperture extending from the first surface to the second surface. The bracket is operable to support a roof-mounted assembly, the bracket aperture being substantially aligned with the first aperture and the second aperture, such that the bracket aperture extends along the axis. The roof attachment assembly further comprises a fastener oriented along the axis, the fastener extending through the first aperture, the second aperture and the bracket aperture to couple the base member to the second membrane and to the bracket.

In another embodiment, the invention provides a roof attachment assembly to be mounted on a membrane roof. The roof attachment assembly comprises a plate defining an aperture, a first surface and a second surface, the first surface facing the membrane roof and the second surface spaced from the membrane roof. The roof attachment assembly also comprises a first membrane positioned adjacent to the first surface of the first plate, a second membrane positioned adjacent to the second surface of the plate and substantially shrouding the plate, a bracket positioned proximate to the second membrane, the bracket defining a recess aligned with an aperture of the plate, the bracket operable to support one or more roof mounted fixtures. The roof attachment assembly further comprises a fastener that substantially mates with the recess of the bracket.

Other aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
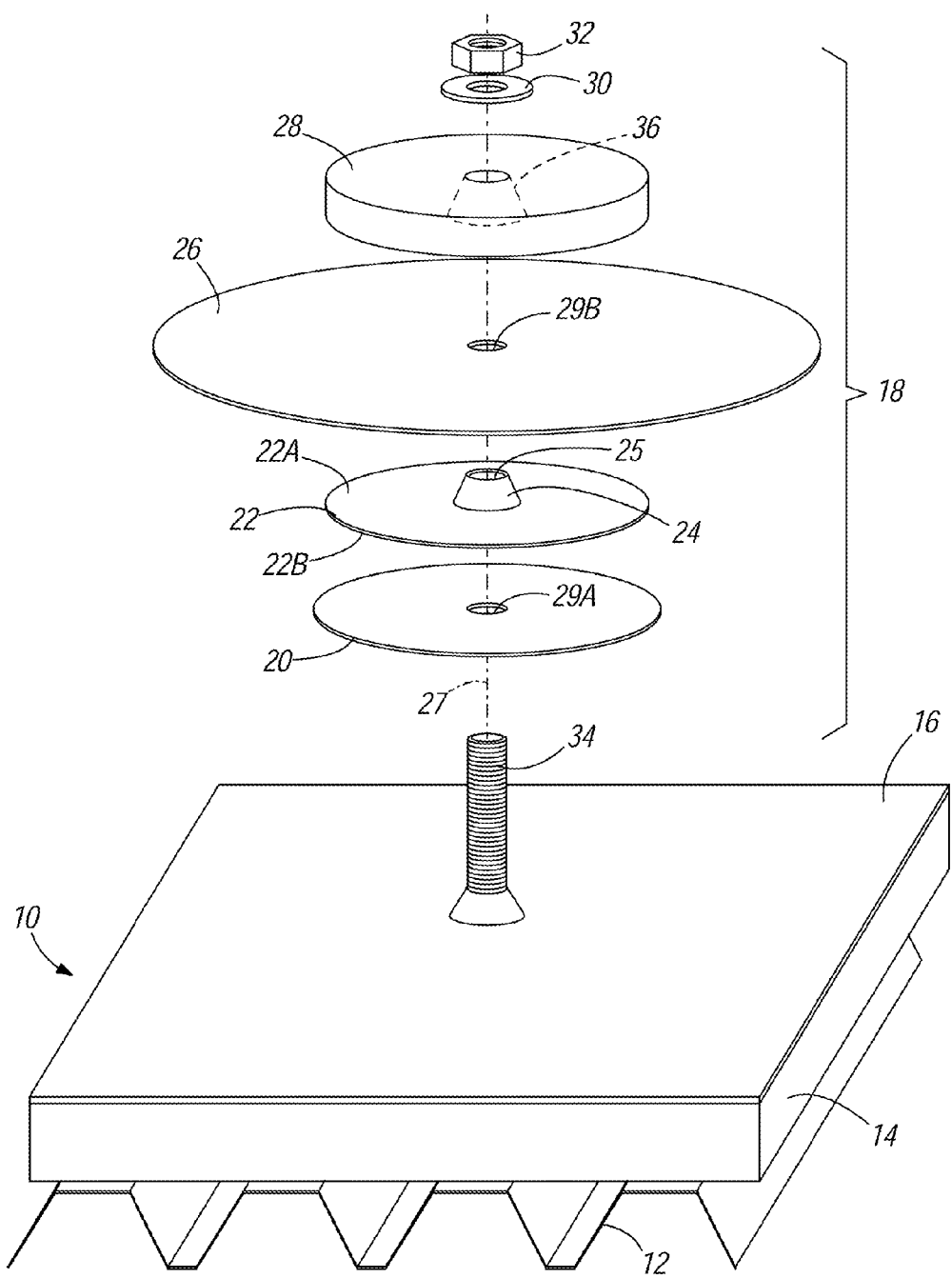
FIG. 1 is an exploded view of a roofing system with a roof attachment assembly according to an embodiment of the present invention.
Figure 2:
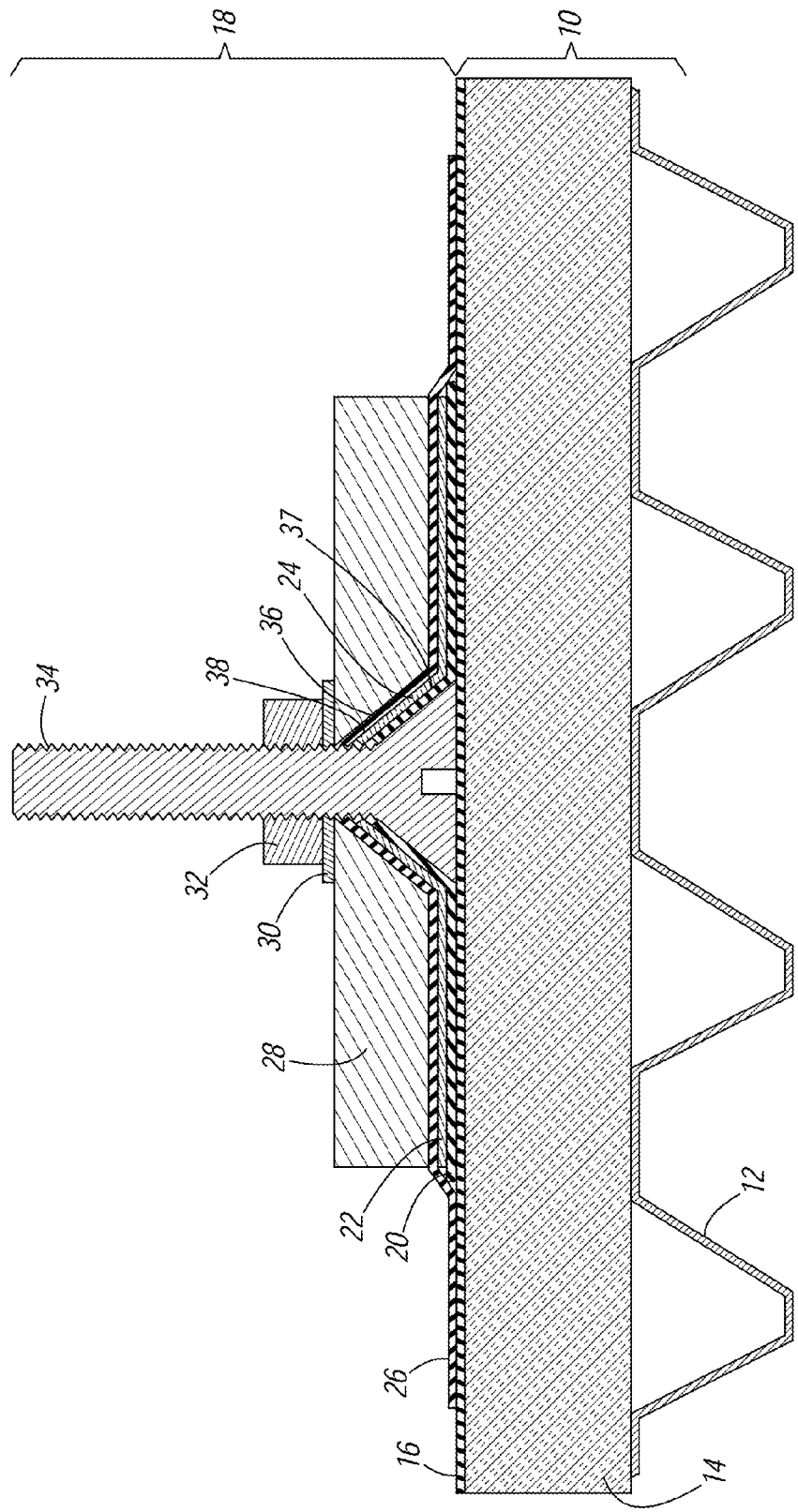
FIG. 2 is a cross-sectional view of the roofing system and the roof attachment assembly of FIG. 1
Figure 2A:
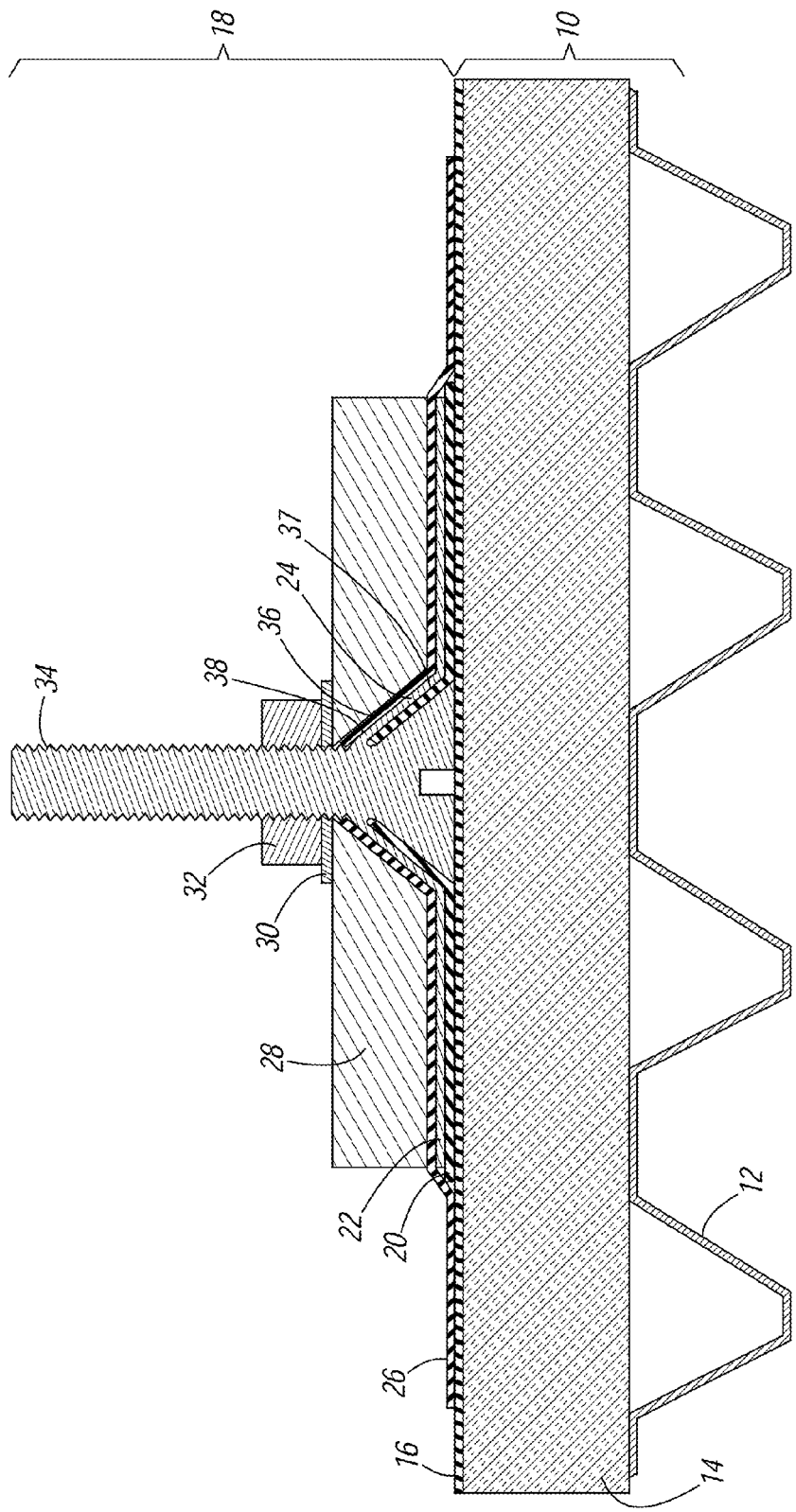
FIG. 2a is a cross-sectional view of a roofing system and a roof attachment assembly according to another embodiment of the present invention.

FIGS. 1 and 2 illustrate a roofing system 10 including a metal roof deck 12, a roof substrate 14 (e.g., insulation, tarpaper, plywood or other decking material, and the like) supported on the roof deck 12, a membrane 16 extending across and supported on the substrate 14 (i.e., placed immediately adjacent an upper surface of the substrate 14 or supported on one or more intermediate layers of roofing or sealing material, which in turn are placed on the substrate 14). The roofing system 10 can be utilized on any of a variety of roof types, such as slate roofs, membrane roofs, aluminum roofs, standing seam roofs, tile roofs, shingle roofs, and the like.

The roofing system 10 is operable to support any of a variety of roof-mounted fixtures, such as, for example, snow fences, solar panels, conduit for solar panels, cables for lighting rods, an antenna, signs, billboards, or any of a number of other roof-mountable assemblies. Depending on one or more of the geographic location, anticipated quantity and type of precipitation, and anticipated roof and wind loading, the roofing system 10 can include any of a variety of flashing, seal and bracket arrangements, as will be discussed below.

A roof attachment assembly 18 can be coupled to the roofing system 10 with few or no fasteners extending through the membrane 16. One such roof attachment assembly 18 is illustrated in FIGS. 1 and 2 and includes a first membrane pad 20, a plate 22 having a substantially frustoconical protrusion 24, a second membrane pad 26, a compression plate 28, a washer 30, a nut 32 and a bolt 34. The bolt 34 extends through the first membrane pad 20, the frustoconical protrusion 24 of the plate 22, the second membrane pad 26, the compression plate 28, the washer 30 and the nut 32. In other embodiments, the washer 30 and the nut 32 can be omitted and the bolt 34 can be connected to a bracket 43 that is operable to act as a standoff and to support one or more roof mounted fixtures.

For example, the body of the bolt 34 can substantially mate with a recess defined by the bracket to secure the bracket to the roof attachment assembly 18.

Although the illustrated roof attachment assembly 18 is substantially circular, other shapes are possible. For example, the roof attachment assembly 18 can be square, ovular, round, rectangular, triangular, pentagonal or other regular or non-regular shape.

In some embodiments, the plate 22 can include one or more stiffening ribs or flanges to increase rigidity. The plate 22 has a top surface 22A facing the second membrane pad 26 and a bottom surface 22B facing the first membrane pad 20. In other words, the bottom surface 22B of the plate faces the roof substrate and the top surface 22A is spaced from the roof substrate. In some embodiments, the top surface 22A and/or the bottom surface 22B is coated with a material similar to the roof material, such as a membranous material. Embodiments in which both the top surface 22A and the bottom surface 22B are coated can omit one or more of the first membrane pad 20 and the second membrane pad 26.

The illustrated plate 22 is substantially circular, but the plate can be other regular or non-regular shapes. The illustrated plate 22 is metallic, but is other embodiments the plate is polymeric.

Figure 1A:
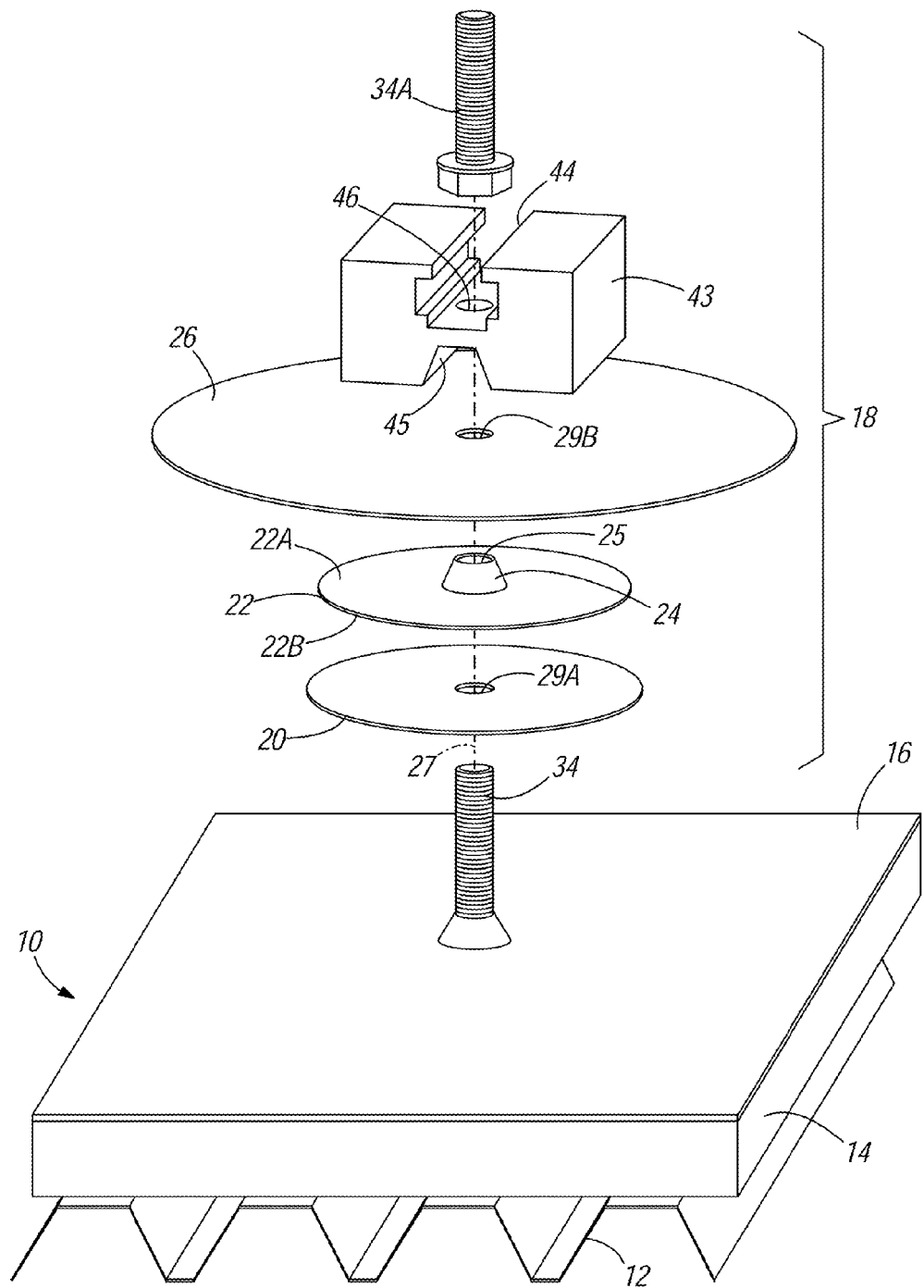
FIG. 1A is an exploded view of an alternative embodiment of the roof attachment assembly according of FIG. 1.

The plate 22 extends substantially along a plane. The frustoconical protrusion 24 of the plate 22 extends away from the roof substrate 14 and defines an aperture 25 extending along an axis 27. The aperture 25 is circular, but in other embodiments, can have other regular or irregular shapes. The illustrated aperture 25 is substantially centered on the upwardly extending protrusion 24, but other, non-centered embodiments are possible. The frustoconical protrusion 24 has a diameter in the plane, and the aperture 25 has diameter in a second plane that is substantially parallel to but spaced from the plane. The diameter of the aperture 25 is less than the diameter of the protrusion 24, to form a truncated cone or frustoconical shape. In other embodiments, the protrusion 24 can have other shapes and configurations, corresponding to the shape of an underside of an associated bracket 43 (shown in FIG. 1A).

As best illustrated in FIG. 2, the protrusion 24 defines a concave interior side 37 and an exterior side 38. As used herein, frustoconical includes cones with rounded, flat, non-flat or nearly flat upper portions and truncated cones with rounded, flat, non-flat or nearly flat upper portions. The illustrated upwardly extending protrusion 24 is circular, but in other embodiments, can be square, D-shaped, triangular, pentagonal, hexagonal, ovular, or other regular or irregular shapes. Similarly, in some embodiments, the concave interior side 37 of the protrusion 24 may have a number of different shapes and configurations, including but not limited to configurations in which the arch provided by the interior side 37 does not include a uniform radius.

In some embodiments, the plate 22 and the bolt 34 are connected to inhibit rotation of the bolt with respect to the plate 22. The plate 22 and the bolt 34 can be connected by spot welding, heat welding, forging, indenting the threads with pins or other projections, double-sided tape or other adhesive, or other permanent or semi-permanent connection. The connected plate 22 and bolt 34 can be sold as a single component. In other embodiments, the plate 22 and the bolt 34 can be sold as separate components.

The first membrane 20 and the second membrane 26 have substantially circular shapes, but other shapes of these membranes are possible. In one embodiment, the first membrane 20, the second membrane 26, and the roof membrane 16 are constructed from the same material (e.g., polymeric material). In other embodiments, these membranes can be constructed from different materials. In the illustrated embodiment, the diameter of the second membrane 26 is larger than the diameter of the first membrane 20, but in other embodiments the membranes 20 and 26 can have different diameters. The second membrane 26 extends outwardly beyond the outer perimeter of the plates 22 and 28. The second membrane 26 is secured to the plate 22 and forms a skirt at least partially enclosing the plate 22. The first membrane 20 is positioned adjacent to the bottom surface 22B of the plate 22, and the second membrane 26 is positioned adjacent to the top surface 22A of the plate 22. The first membrane 20 and the second membrane 26 include corresponding apertures 29A and 29B. The apertures 29A and 29B of the membranes 20 and 26 are substantially aligned with the aperture 25 of the plate 22, such that that the apertures 29A and 29B extend along the axis 27.

The compression plate 28 can include a substantially frustoconical recess 36 that matingly receives the frustoconical protrusion 24 at least partially therein. The second membrane 26 is compressed between the compression plate 28 and the plate 22 at an approximate center or aperture 29A. Thus, the compression plate 28 and the plate 22 act like a clamp on the second membrane 26. The clamp created by the compression plate 28 and the plate 22 deforms the second membrane 26 to define a circuitous path between the plates 22 and 28.

Figure 5:
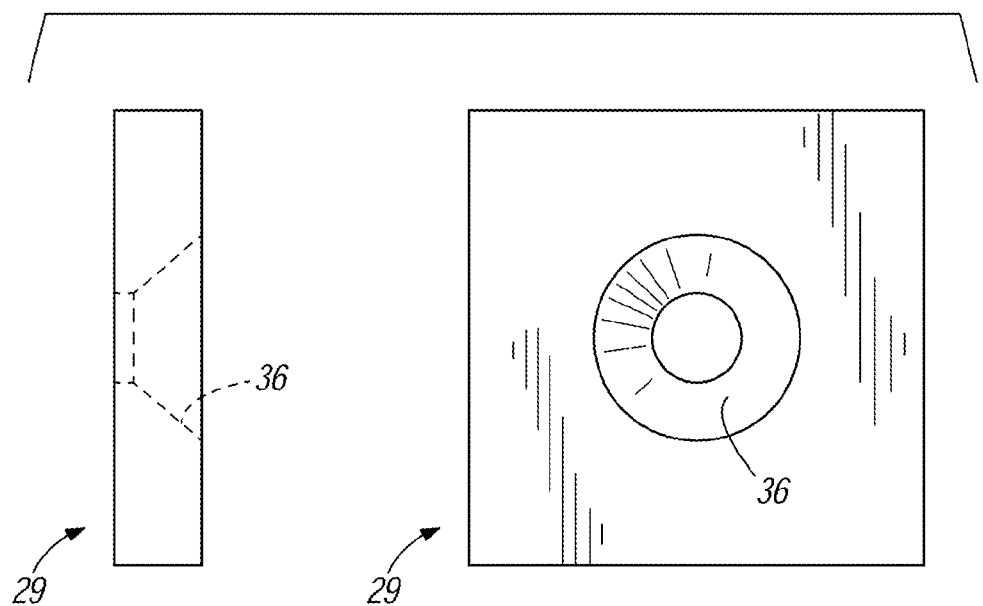

The bolt 34 applies an adjustable compression force to the second membrane 26 between the compression plate 28 and the plate 22. The outwardly extending base of the bolt 34 is countered to matingly engage a recess defined in concave interior side 37 of the frustoconical protrusion 24. The base of the bolt 34 is positioned adjacent to the roof membrane 16 and the body of the bolt 34 is received within the frustoconical recess 36 of the plate 28. The compression plate 28 illustrated in FIGS. 1-4. is circular, but a square compression plate 29 having a frustoconical recess 36 is illustrated in FIG. 5. Any suitable size and shape compression plate can be utilized. In some embodiments, the compression plate 28, 29 can be omitted.

The frustoconical protrusion 24 of the plate 22 can substantially match a head shape of the bolt 34. In some embodiments, the plate 22 and the bolt 34 are formed as a single unitary piece. In some embodiments, the first membrane pad 20 is connected to the bolt 34 (for example by heat welding). In such embodiments, the first membrane pad 20 is connected to the bolt 34 either prior to or while connecting the roof attachment assembly 18 to the roofing system 10. The illustrated plate 22 is substantially circular, but other can be other regular or non-regular shapes.

In some embodiments, other washers and nuts, or other fastening apparatuses and methods are utilized in place of washer 30 and nut 32. In some embodiments, projections or fasteners, other than bolt 34 are utilized. These projections and fasteners may or may not be threaded. The nut 32 can be omitted in embodiments that utilize a bracket having a threaded aperture. In such embodiments, pins or other protrusions can be used to fix the bracket to the fastener or projection. Further, in the embodiments that use a bracket to support a structure on the roof, the roof attachment assembly 18 can act as a seal positioned between the bracket and the roof to prevent leakage around the bracket through the roof.

In some embodiments, in place of the washer 30 and the nut 32, the roof attachment assembly 18 includes a single piece bracket 43. In other embodiments, the bracket 43 replaces the plate 22 and the bolt 34. In some embodiments, the bracket 43 includes at least one horizontal component 43A and an upwardly-facing projection 43B, such as any of the brackets illustrated in FIGS. 12-14. Further, any of the brackets illustrated in published application US 2010/0307074, the entire contents of which are herein incorporated by reference, can be utilized with the present invention. In embodiments that utilize the brackets from US 2010/0307074, the fastener can be inverted, such that the fastener does not penetrate the roof, but rather extends upward through the bracket. In embodiments that utilize the brackets from FIGS. 12-14 or from US 2010/0307074, the brackets are coupled to the roof by any non-penetrating fastening method, such as welding, adhering, gluing, bonding, and the like. The brackets can include one or more stiffening ribs or flanges to increase rigidity. Further, the brackets can each include a coating on either or both of a top surface and a bottom surface of the bracket.

In some embodiments (see FIG. 1A), the bracket 43 is configured to be coupled to the compression plate 28 or to the second membrane 26 and is operable to support one or more roof mounted fixtures. The bracket 43 illustrated in FIG. 1A. is substantially rectangular, but a square, a circle, or other shaped and sized bracket can be utilized. The bracket 43 includes a first recess 44, a second recess 45 and an aperture 46 extending between the first recess 44 and the second recess 45. The illustrated first recess 44 of the bracket 43 is substantially frustoconical and, when the assembly omits the second plate 28, the recess 44 condmatingly receives the frustoconical protrusion 24 at least partially therein. The frustoconical protrusion 24 can substantially match the shape of the first recess 44. In one embodiment, the bolt 34 can extend into the first recess 44 and engage the bracket 43. In other embodiments, the second recess 45 of the bracket 43 is sized to engage the head of a second bolt 34A to inhibit rotation of the second bolt 34A within the second recess 45.

The bracket aperture 46 is substantially circular, but other shapes, such as ovular, square, rectangular, hexagonal, and the like are possible. In one embodiment, the bracket aperture 46 is sized to receive the bolt 34 or any fastener, protrusion, or the like therethrough. The circular shape of the aperture 46 permits flexibility and slight relative movement between the bracket 43 and the bolt 34, fastener, projection or the like, when installed. The bracket aperture 46 is substantially aligned with the plate aperture 25 and the apertures 29A and 29B of the membranes 20 and 26, such that that the bracket apertures 32 also extends along the axis 27.

Figure 14:
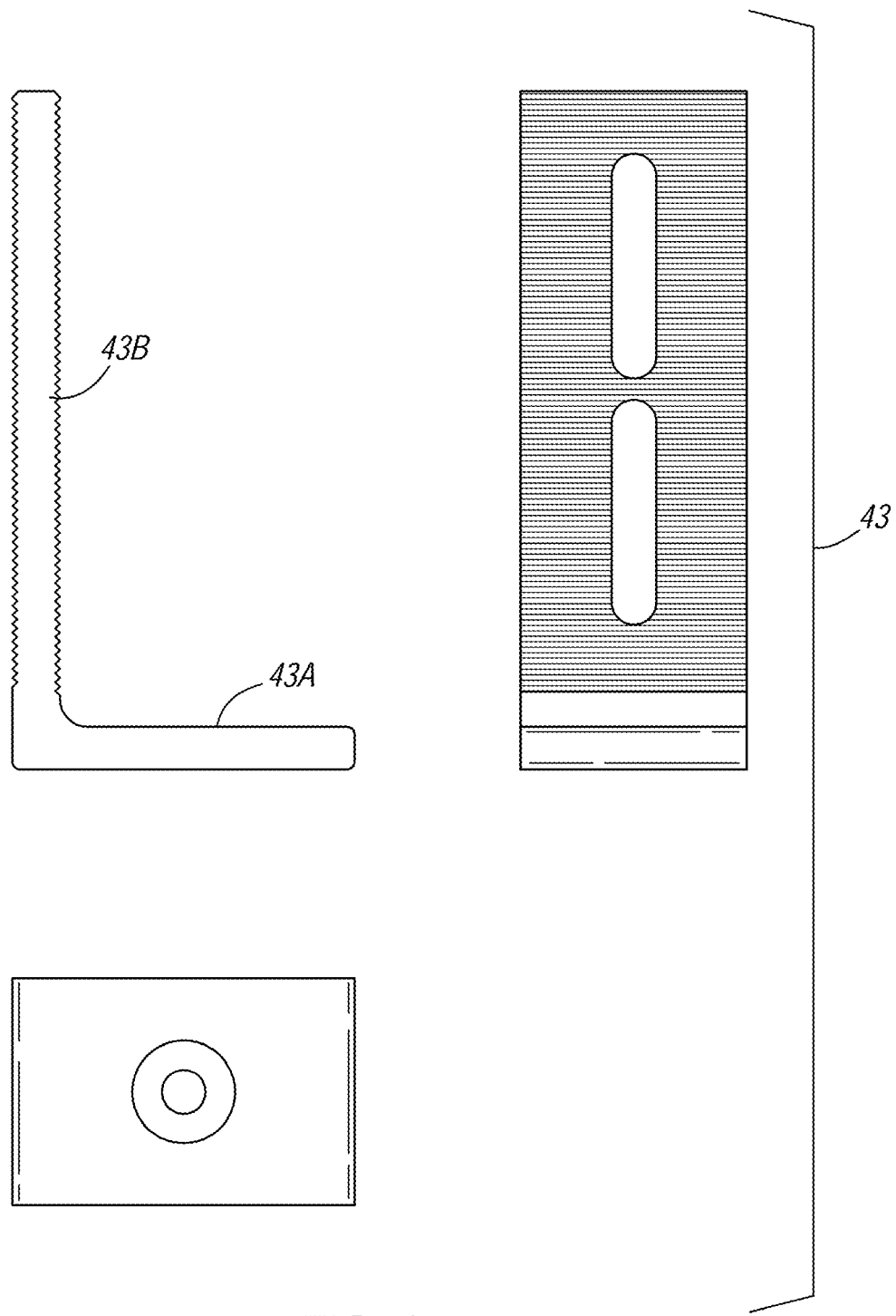
Figure 15:
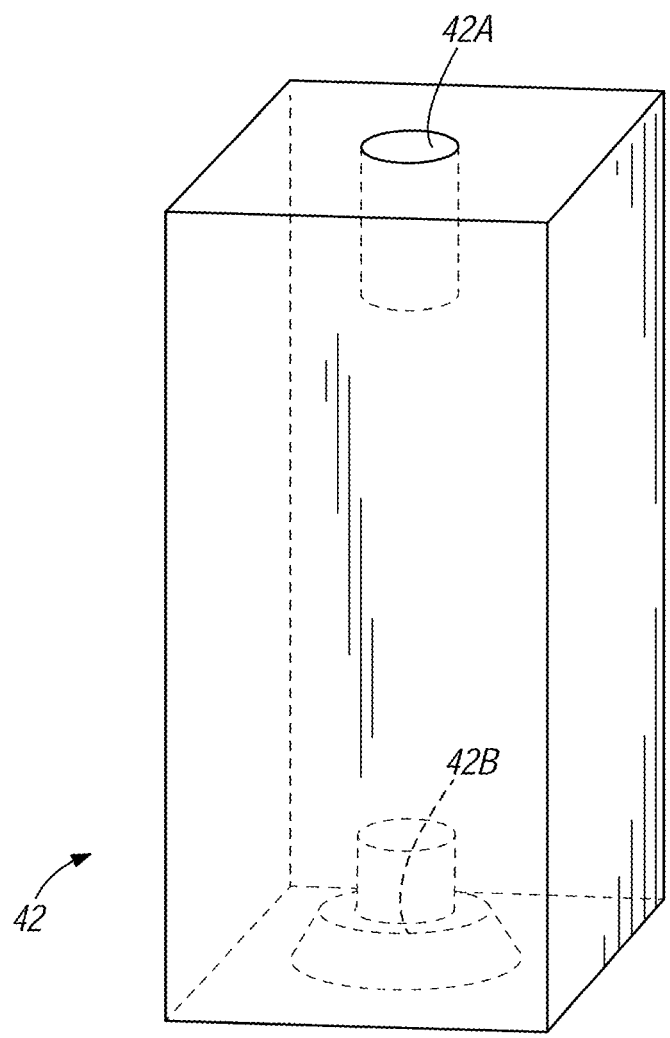
FIG. 15 illustrates an extension useable with the roofing system and the roof attachment assembly.

At least one extension, such as the extension 42 shown in FIG. 15, can be utilized in combination with any of the embodiments described herein. The extension 42 is substantially rectangular, but in other embodiments, the extension 42 can have different shapes. The extension 42 includes a top recess 42A and a bottom recess 42B. In some embodiments, the bottom recess 42B is constructed to accept the frustoconical protrusion 24. The extensions 42 can be threaded onto the bolt 34 (e.g., through the bottom recess 42B) or connected to another fastener in placed of the nut 32. The extension 42 provides adjustability and flexibility to various design and roof arrangements. Other suitable height-adjustment arrangements, such as the bracket illustrated in FIGS. 12-14, or any of the height-adjustable brackets in co-pending patent application Ser. No. 12/727,726, filed Oct. 28, 2010, the entire contents of which are herein incorporated by reference, can be utilized in combination with the present invention.

Figure 3:
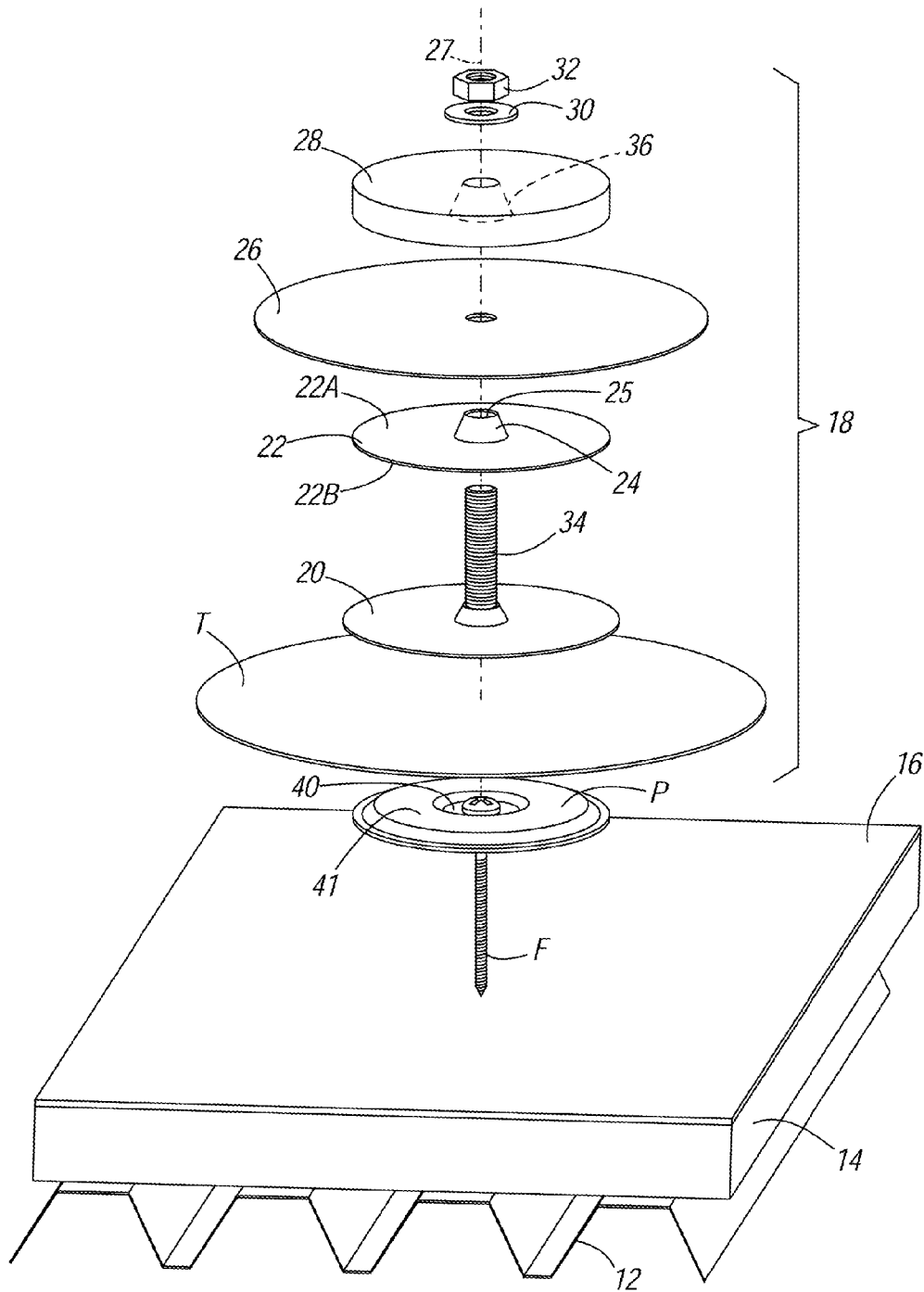
FIG. 3 is an exploded view of an alternative embodiment of a roof attachment assembly according to an embodiment of the present invention.
Figure 4:
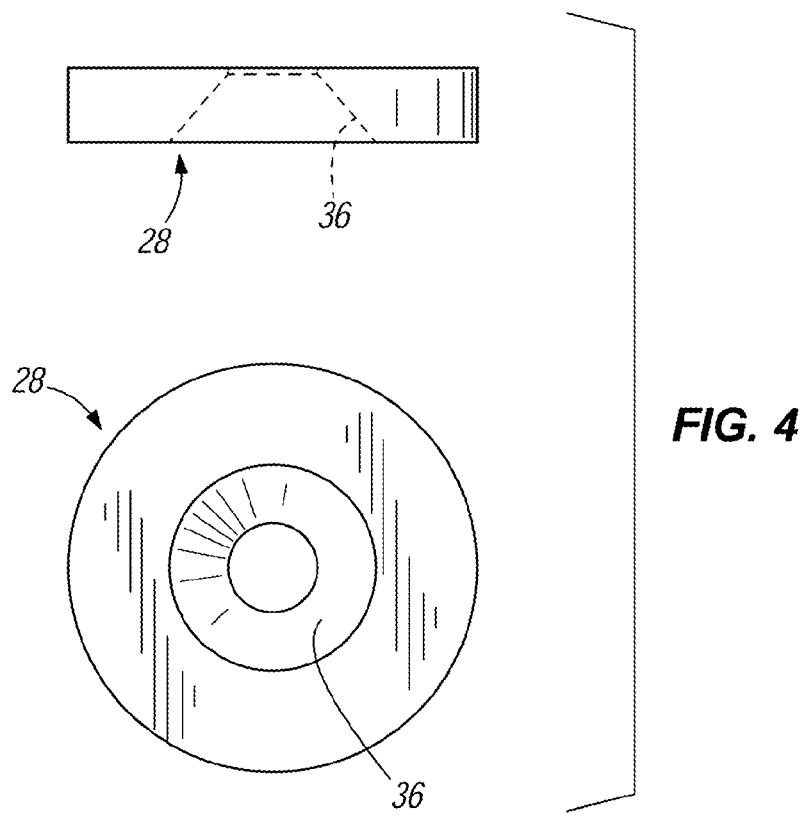
FIGS. 4 and 5 illustrate compression plates useable with the roofing system and the roof attachment assembly of FIGS. 1-3.

The roof attachment assembly 18 can be coupled to the roofing system 10 with any suitable non-penetrating fastening method, such as welding, adhering, gluing, bonding, and the like. The roof attachment assembly 18 can be coupled directly to the roof membrane 16 (as shown in FIGS. 1 and 2) or can be coupled to a target patch T positioned on the roof membrane 16 of the roof substrate 14 (as shown in FIG. 3). As illustrated in FIG. 3, the roof attachment assembly 18 can be coupled to the roofing system above the target patch T (also known as a membrane or a flashing) and a plate P that is secured by a roof-penetrating fastener F.

The plate P is substantially circular, but the plate P can be other regular or non-regular shapes. The plate P defines a counterbore or recess 40 that is configured to accept the fastener F. Further, the plate P defines a top surface 41 spaced from the roof membrane 16 and the roof substrate 14. One of the sides of the target patch T is adjacent to the top surface 41 of the plate P, and the other side of the target patch T is adjacent to the first membrane 20. The illustrated embodiment includes a RhinoBond® plate P and fastener F, but other plates, fasteners and other roof mounting structures can be utilized. In the embodiment shown in FIG. 3, the diameter of the target patch T is substantially larger than the diameter of the plate P. However, in other embodiments, the target patch T and the plate P can have different diameters. The fastener F can be a bolt, a screw, or any other suitable fastener that allows that plate P to be securely coupled to the roof substrate 14. The target patch T seals any penetrations caused by the fastener F.

The roof attachment assembly 18 is operable to support any of a variety of roof-mounted fixtures, such as snow guards, snow fences, solar panels, conduit for solar panels, cables for lighting rods, an antenna, signs, billboards, or any other assembly mountable to a roof. Some roof-mounted fixtures are described in detail in commonly-assigned U.S. Pat. No. 5,609,326, filed Jun. 16, 1995, and U.S. Pat. No. 6,526,701, filed Dec. 6, 2000, the contents of both of which are herein incorporated by reference.

In some embodiments of the roof attachment assembly 18 that omit the first membrane pad 20, the second membrane pad 26 is welded, glued or otherwise adhered to the membrane 16 only around a perimeter of the first membrane pad 20. Thus, a secured bond is formed between the second membrane pad 26 and the roof membrane 16. In some embodiments, this bond non-removably secures the roof attachment assembly 18 to the roof. It is to be understood that non-removable attachment requires damage to the roof membrane 16 in order to remove the roof attachment assembly 18 from the roof 10. In other embodiments that omit the first membrane pad 20, the plate 22 is coated on the top surface 22A and/or the bottom surface 22B with a membranous material, an adhesive. In some embodiments, an adhesive, such as double-sided tape or a double-sided RhinoBond® plate is connected to the bottom surface 22B, to adhere the plate 22 directly to the membrane 16.

In some embodiments, the first membrane pad 20 is coupled to the roof membrane 16 by any suitable non-penetrating method, and then in a subsequent step, the plate 22 or one of the brackets is coupled to the first membrane pad 20. In other embodiments, the plate 22 or one of the brackets is coupled to the first membrane pad 20 to form a single unit, and the single unit is coupled to the roof membrane 16 by any suitable non-penetrating method. In these embodiments, the second membrane pad 26 can be omitted.

In some embodiments, the plate 22 or one of the brackets is coupled to the roof membrane 16 by any suitable non-penetrating method, and then the second membrane pad 26 is coupled to the plate 22 or one of the brackets. In other embodiments, the plate 22 or one of the brackets is coupled to the second membrane pad 26 to form a single unit, and the single unit is coupled to the roof membrane 16 by any suitable non-penetrating method. In these embodiments, the first membrane pad 20 can be omitted.

In some embodiments, the first membrane pad 20 is coupled to the roof membrane 16 by any suitable non-penetrating method, then the plate 22 or one of the brackets is coupled to the first membrane pad 20, and then the second membrane pad 26 is coupled to the plate 22 or one of the brackets, is coupled to the first membrane pad 20, and is coupled to the roof membrane 16. In other embodiments, the plate 22 or one of the brackets is coupled to the first membrane pad 20 and the second membrane pad 26 to form a single unit, and the single unit is coupled to the roof membrane 16 by any suitable non-penetrating method.

One suitable non-penetrating fastening method includes providing an adhesive on any of the roof membrane 16, the first membrane 20, the plate 22 and the second membrane 26. In some embodiments, one or more of the membranes 16, 20, 26 comprises a meltable material that can be construed as an adhesive. In other embodiments, a separate adhesive is applied to the top 22A and/or the bottom 22B of the plate 22. The roof attachment assembly 18 is positioned on the roof membrane 16, and is then heated by a heat source, such as by an induction coil. The adhesive at least partially melts in response to the heat source. Once solidified, the adhesive can couple the roof attachment assembly 18 to the roof membrane 16. In some embodiments, one or more weights are positioned on the roof attachment assembly 18 during or subsequent to heating, to deform the molten adhesive, and thereby encourage adhesion of the roof attachment assembly 18 to the roof membrane 16. Other suitable methods are possible, such as welding, gluing, adhering, bonding and the like, and the present method is given by way of example only.

In some embodiments, the first membrane 20 is adhered to the roof membrane 16 to couple the roof attachment assembly 18 to the roofing system 10. In other embodiments, the second membrane 26 is adhered to the roof membrane 16 to couple the roof attachment assembly 18 to the roofing system 10. In some embodiments, the plate 22 is adhered to the roof membrane 16 to couple the roof attachment assembly 18 to the roofing system 10. In other embodiments, the second membrane 26 is adhered to the plate 22, and the plate 22 is adhered to the roof membrane 16 to couple the roof attachment assembly 18 to the roofing system 10. In some embodiments, the second membrane 26 is adhered to the plate 22, the plate 22 is adhered to the first membrane 20 and the first membrane 20 is adhered to the roof membrane 16 to couple the roof attachment assembly 18 to the roofing system 10. In other embodiments, two or more of the first membrane 20, the plate 22 and the second membrane 26 are adhered to the roof membrane 16 to couple the roof attachment assembly 18 to the roofing system 10.

Figure 6:
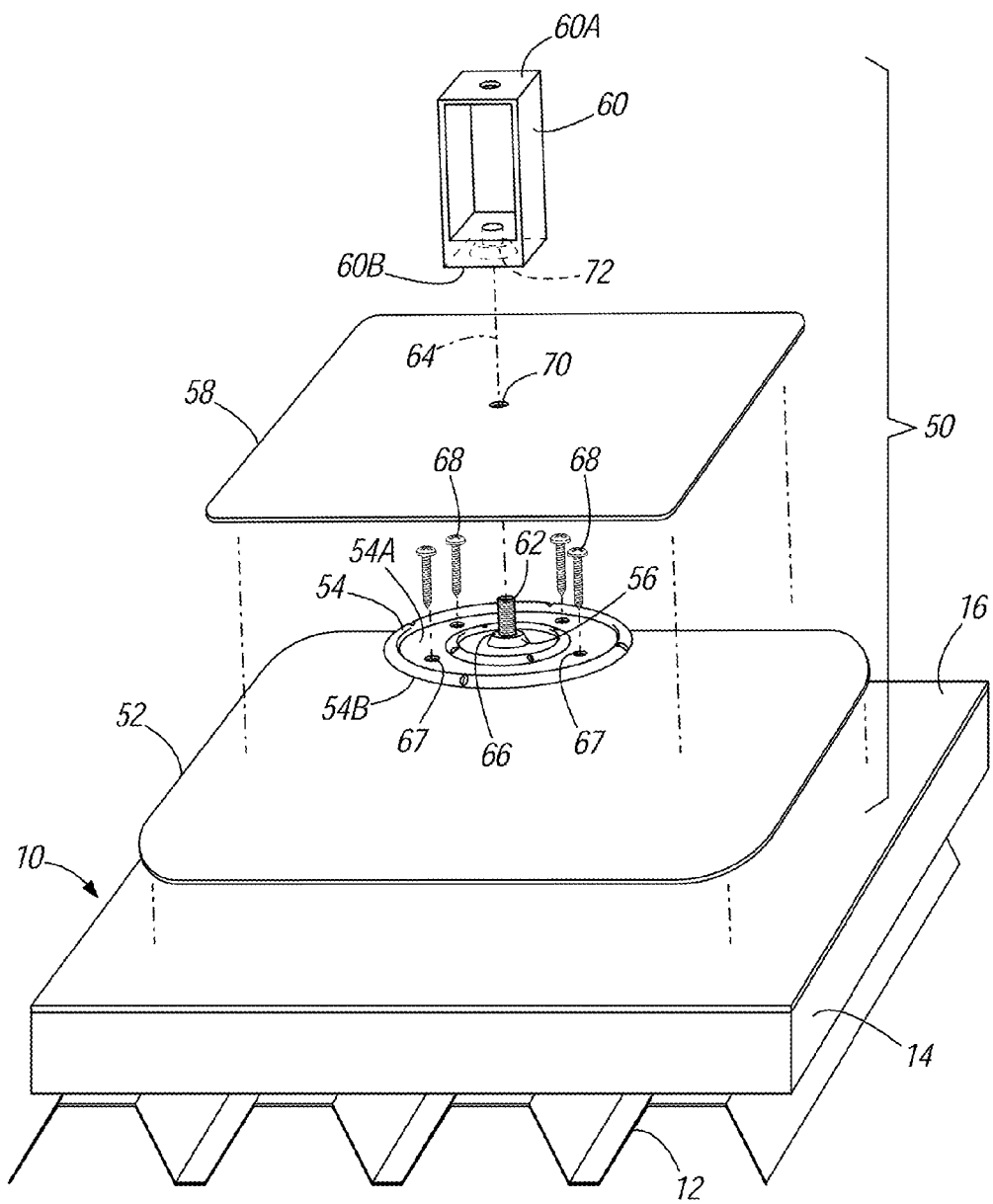
FIG. 6 is an exploded view of a roofing system with a roof attachment assembly according to another embodiment of the present invention.
Figure 7:
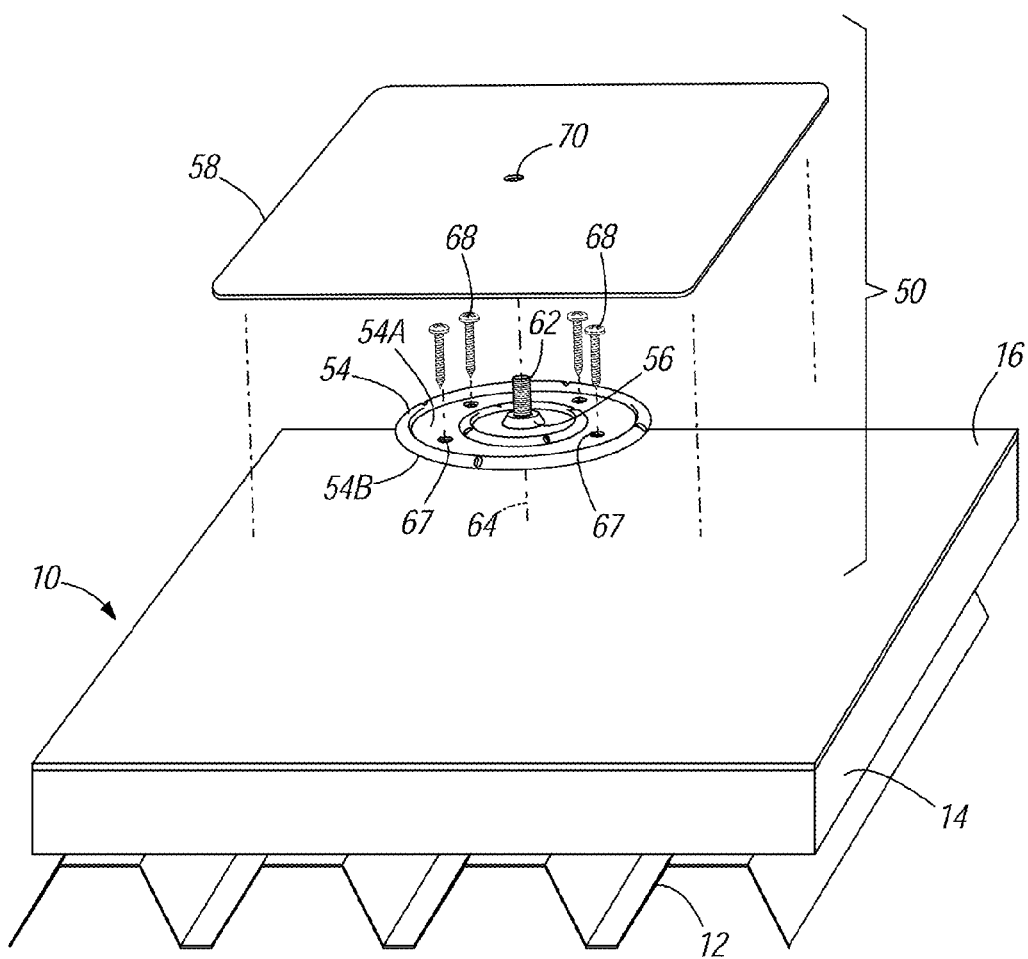
FIG. 7 is an exploded view of an alternative embodiment of the roofing system with the roof attachment assembly of FIG. 6.
Figure 8:
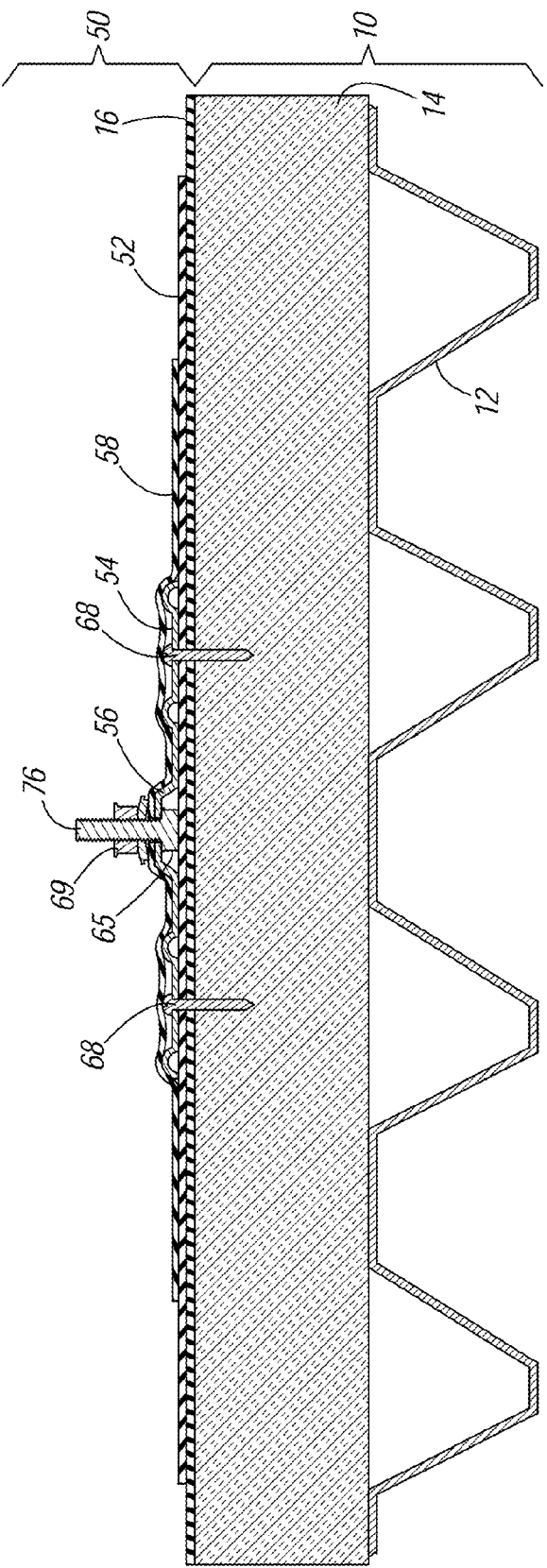
FIG. 8 is a cross-sectional view of the roofing system and the roof attachment assembly of FIG. 7.

FIGS. 6-8 illustrate another construction of a roof attachment assembly 50. The roof attachment assembly 50 can be coupled to a roofing system 10, which is similar to the previously described roofing system 10 of FIGS. 1-3. Specifically, the roof attachment assembly 50 can be attached to a roof substrate 14 having a roof membrane 16. The roof attachment assembly 50 includes a first membrane pad 52 supported on the roof substrate 14, a plate or a base member 54 having a substantially frustoconical protrusion 56, a second membrane pad 58, a bracket 60, and a fastener 62 (e.g., a bolt). The fastener 62 extends through the plate 54, the second membrane 58, and the bracket 60 to couple the plate 54, the second membrane 58 and the bracket 60. In other embodiments, the fastener 62 can also extend through the roof substrate 14.

In the illustrated embodiment, the first membrane 52 is supported on the roof substrate 14. In one embodiment, the first membrane 52 defines a perimeter that is larger than the perimeter defined by the plate 54 and the second membrane 58. The first membrane 52 and the roof substrate 14 can be connected by spot welding, heat welding, forging, indenting the threads with pins or other projections, double-sided tape or other adhesive, by fasteners, or other permanent or semi-permanent connection. In one embodiment, the length of the first membrane is approximately sixteen inches, but the length can be larger or smaller.

The illustrated plate 54 of the roof attachment assembly 50 is substantially circular, but the plate can be other regular or non-regular shapes. The 54 is metallic, but is other embodiments the plate is polymeric. The plate 54 defines a first surface 54A positioned substantially adjacent the first membrane 52, and a second surface 54B spaced from the roof substrate and the first membrane. The frustoconical protrusion 56 of the plate 54 extends away from the roof substrate 14 along an axis 64. Further, the first surface 54A of the plate 54 forms a frustoconical recess 65 and the second surface 54B forms the frustoconical protrusion 56. The frustoconical protrusion 56 of the plate 54 defines an aperture 66 extending along the axis 64 from the first surface 54A to the second surface 54B. The first aperture 66 is substantially centrally positioned in the frustoconical protrusion 56.

In one embodiment, the plate 54 includes a plurality of openings 67 extending from the first surface 54A through the second surface 54B. The openings 67 are configured to accept fasteners 68 (e.g., bolts, screws, etc.) that couple the plate 54 to the first membrane 52 and to the roof substrate 14 of the roofing system 10. In other embodiments, the plate 54 does not use fasteners 68, but is coupled to the roof substrate 14 via other suitable non-penetrating methods or mechanisms (e.g., via adhesive, heat welding, forging, etc.).

The second membrane 58 is positioned substantially adjacent the second surface 54B of the plate 54 and is coupled to the first membrane 52. The second membrane 58 defines a surface area or a perimeter that is greater than the surface area of the plate 54. The second membrane 58 is deformable to substantially conform to the frustoconical protrusion 56 of the plate 54 when the second membrane 58 attaches to the plate 54. Further, the second membrane 58 defines an aperture 70 extending through the second membrane 58, where the aperture 70 is substantially aligned with the aperture 66 of the plate 54, such that the aperture 70 extends along the axis 64.

In one embodiment, the bracket 60 of the roof attachment assembly 50 is coupled to the second membrane 58 via the fastener 62. The bracket 60 is operable to support at least one roof-mounted assembly. The bracket 60 defines a first surface 60A spaced from the second membrane 58 and a second surface 60B positioned substantially adjacent the second membrane 58. The bracket 60 further defines an aperture 72 extending from the first surface 60A to the second surface 60B. The frustoconical protrusion 56 extends at least partially into the bracket aperture 72. Because the second membrane 58 is deformed by the frustoconical protrusion 56, the second membrane 58 also extends into the bracket aperture 72. The bracket aperture 72 is substantially aligned with the aperture 66 of the plate 54 and the aperture 70 of the second membrane 58 such the bracket aperture 72 extends along the axis 64.

The fastener 62 of the roof attachment assembly 50 is oriented along the axis 64 and extends through the aperture 66 of the plate 54, the aperture 70 of the second membrane 58, and the bracket aperture 72 to couple the plate 54 to the second membrane 58 and to the bracket 60. In one embodiment, the diameter defined by the plate 54 is greater than the diameter defined by the aperture 66 of the plate 54 and the diameter defined by the aperture 70 of the second membrane 58.

In some embodiments, the roof attachment assembly 50 is constructed without the bracket 60 or the first membrane 52 (see FIG. 6). In these embodiments, the plate 54 is directly positioned on the roof substrate 14 or the roof membrane 16 of the roofing system 10. The plate 54 can be heat welded, or otherwise coupled, to the second membrane 58. Further, the plate 54 can be attached to the roof substrate 14 via the fasteners 68 or by any other reasonable means. The fastener 62 extends through the aperture 66 of the plate 54 and the aperture 70 of the second membrane 58 to couple the plate to the second membrane 58.

In other embodiments, the fastener 62 of the roof attachment assembly 50 is configured to accept a compression fitting 69 (see FIG. 8). The fastener 62 further defines an attachment point 76 exposed for mechanical fastening.

Figure 9:
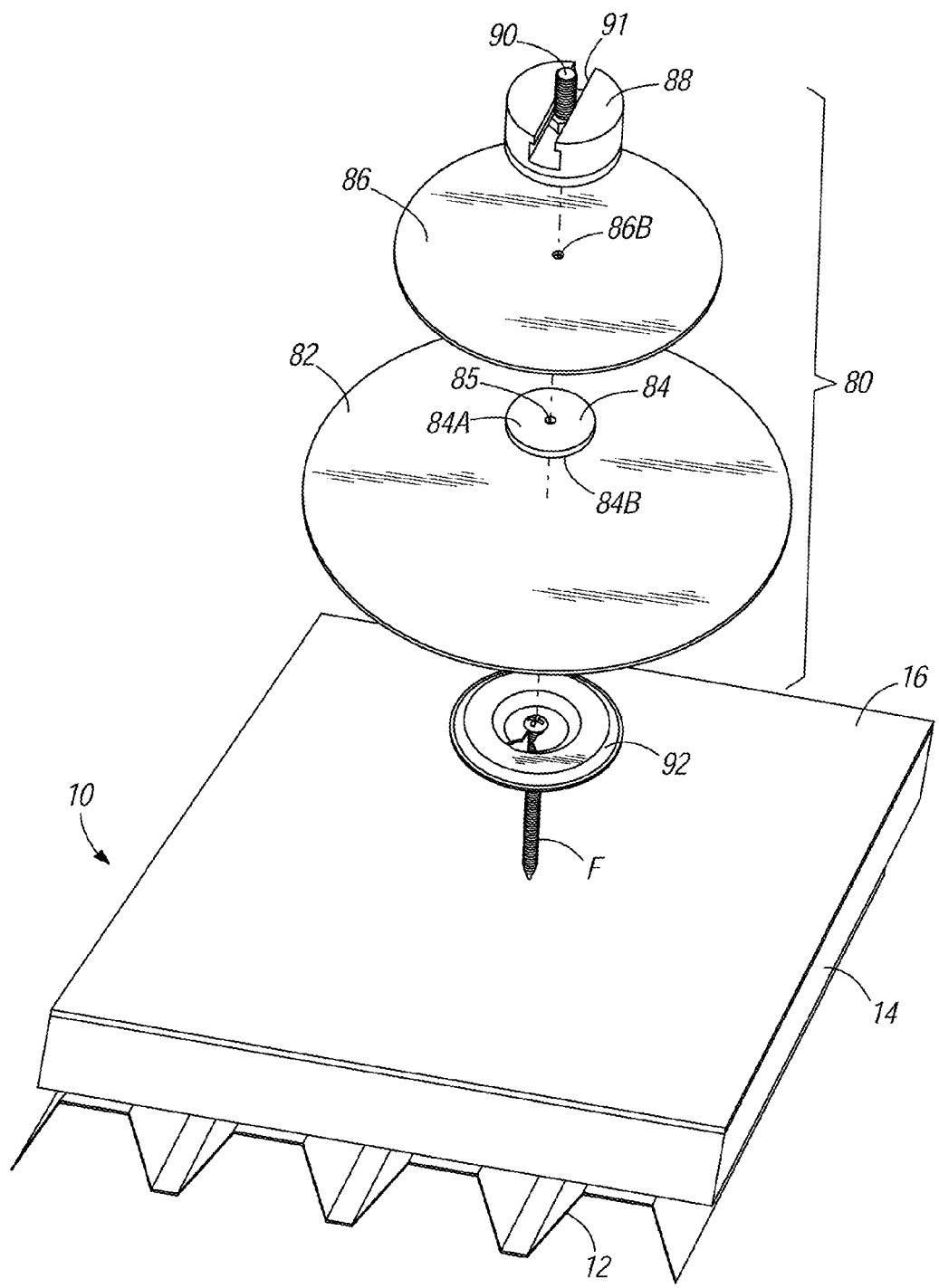
FIG. 9 is an exploded view of a roofing system with a roof attachment assembly according to another embodiment of the present invention.
Figure 10:
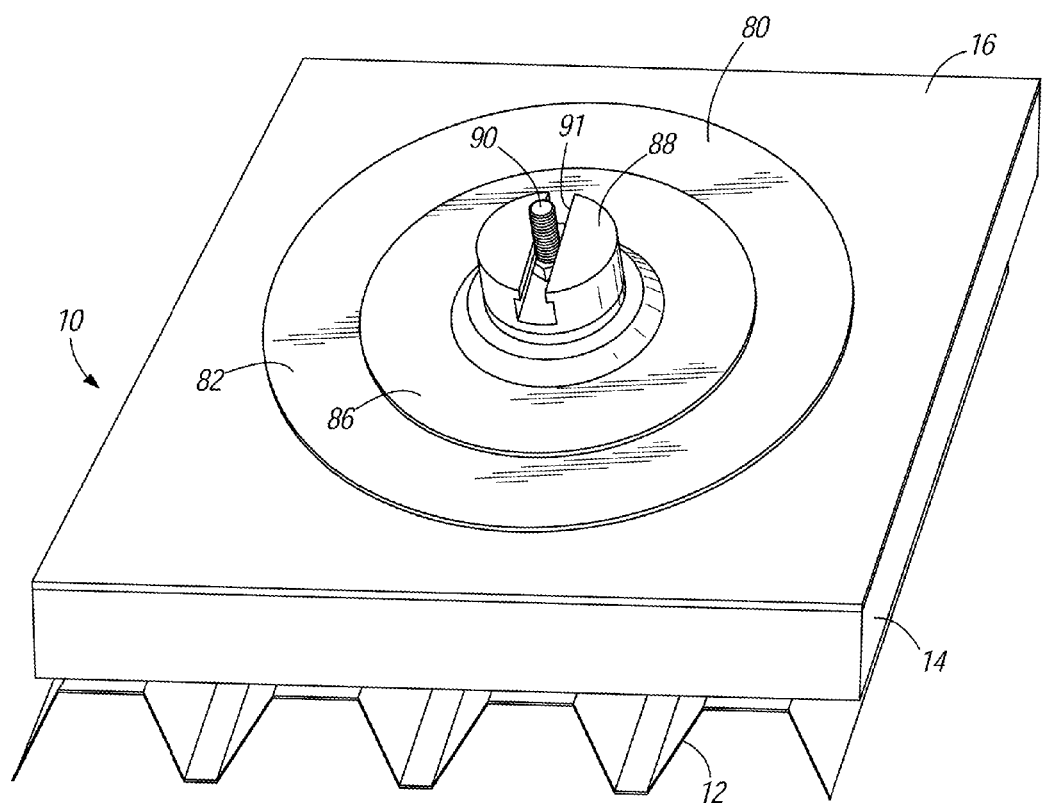
FIG. 10 is an assembled view of the roofing system with the roof attachment assembly of FIG. 9.
Figure 11:
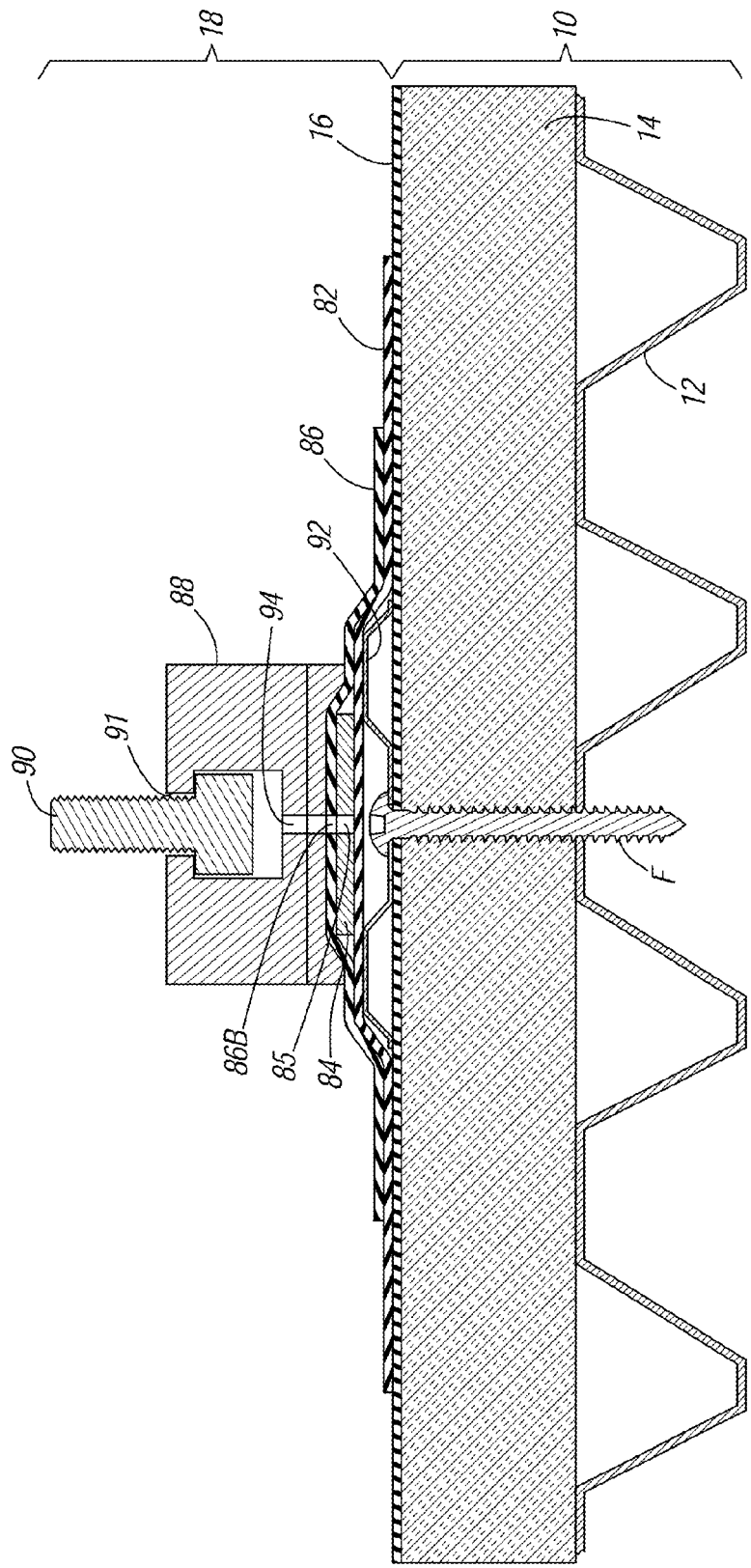
FIG. 11 is a cross-sectional view of the roofing system and the roof attachment assembly of FIG. 9.

FIGS. 9-11 illustrate another construction of a roof attachment assembly 80. The roof attachment assembly 80 can be attached to a roofing system 10, which is similar to the previously described roofing system 10. The roof attachment assembly 80 includes a first membrane pad 82 supported on the roof substrate 14 or the roof membrane 16, a plate 84 defining a center aperture 85, a second membrane pad 86, a bracket 88, and a fastener 90 (e.g., a bolt). The fastener 90 extends upwardly through a recess of the bracket 88 and is operable to support one or more roof mounted fixtures.

The roof attachment assembly 80 can be coupled to the roofing system 10 with any suitable non-penetrating fastening method, such as welding, adhering, gluing, bonding, and the like. The roof attachment assembly 80 can be coupled directly to the roof membrane 16 or can be coupled to a plate 92 positioned on the roof membrane 16 of the roof substrate 14. As illustrated in FIGS. 9-11, the plate 92 is secured by a roof-penetrating fastener F. The roof attachment assembly 80 is operable to support any of a variety of roof-mounted fixtures, such as snow guards, snow fences, solar panels, conduit for solar panels, cables for lighting rods, an antenna, signs, billboards, or any other assembly mountable to a roof.

The plate 84 has a top surface 84A facing the second membrane pad 86 and a bottom surface 84B facing the first membrane pad 82 and the membrane roof. In some embodiments, the top surface 84A and/or the bottom surface 84B is coated with a material similar to the roof material, such as a membranous material. Embodiments in which both the top surface 84A and the bottom surface 84B are coated can omit one or more of the first membrane pad 82 and the second membrane pad 86. In other embodiments, a fastener (not shown) can extend through the aperture 85 of the plate 84 to couple the plate 84 and the first membrane 82 to the roof. In these embodiments, the roof attachment assembly 80 may omit the second membrane 86 and/or the bracket 88. The fastener extending through the plate 84 and the first membrane 82 can be configured to attach to a bracket that supports a roof mounting fixture. Further, in these embodiments, the plate 84 and the first membrane 82 can be single monolithic component.

The illustrated plate 84 is substantially circular, but the plate can be other regular or non-regular shapes. The illustrated plate 84 is metallic, but is other embodiments the plate is polymeric. The aperture 85 defined by the plate 84 is circular, but in other embodiments, can have other regular or irregular shapes. The illustrated aperture 85 is positioned substantially centered on the plate 84, but other, non-centered embodiments are possible.

The first membrane 82 and the second membrane 86 have substantially circular shapes, but other shapes of these membranes are possible. In one embodiment, the first membrane 82 and the second membrane 86 are constructed from the same material (e.g., polymeric material). In the illustrated embodiment, the diameter of the second membrane 86 is smaller than the diameter of the first membrane 82, but in other embodiments the membranes 82 and 86 can have different diameters. The second membrane 86 extends outwardly beyond the outer perimeter of the plate 84 and shrouds the plate 84. The second membrane 86 is configured to substantially conform to the shape of the plate 84, when the plate 84 is compressed between the first membrane 82 and the second membrane 86.

The first membrane 82 is positioned adjacent to the bottom surface 84B of the plate 84, and the second membrane 86 is positioned adjacent to the top surface 84A of the plate 84. In some embodiments, the first membrane 82 and the second membrane 86 include corresponding apertures 82A (not shown) and 86B. The apertures 82A and 86B of the membranes 82 and 86 are substantially aligned with the aperture 85 of the plate 84. In other embodiments, the first membrane does not include an aperture.

The bracket 88 is configured to be coupled to the second membrane 86 and is operable to support one or more roof mounted fixtures. The bracket 88 illustrated in FIGS. 9-11 is substantially circular, but a square, a rectangular, or other shaped and sized bracket can be utilized. The bracket defines a first recess 91 positioned on the upper portion of the bracket 88, and a second recess or an aperture 94 positioned near the second membrane 86. The bracket aperture 94 is substantially circular, but other shapes, such as ovular, square, rectangular, hexagonal, and the like are possible. In one embodiment, the assembly 80 can include a fastener (not shown) extending through the apertures 82A, 85, and 86B and engaging the second recess 94 of the bracket 88. The circular shape of the aperture 94 permits flexibility and slight relative movement between the bracket 88 and the fastener, projection or the like, when installed. In the illustrated embodiment, the first recess 91 of the bracket 88 is sized to engage the head of the fastener 90 to inhibit rotation of the fastener 90 within the first recess 91.

The roof attachment assembly 80 can include other types of plates that differ from the plate 84. Further, the roof attachment assembly 80 can include any of the previously described brackets.

A possible non-penetrating fastening method for attaching the roof attachment assembly 80 includes providing an adhesive on any of the roof membrane 16, the plate 84, the first membrane 82 and the second membrane 86. In some embodiments, one or more of the roof membrane 16, the plate 84, the first membrane 82 and the second membrane 86 comprises a meltable material that can be construed as an adhesive. In other embodiments, a separate adhesive is applied to the top and/or the bottom 84A/84B of the plate 84. The roof attachment assembly 80 is positioned on the roof membrane 16, and is then heated by a heat source, such as by an induction coil. The adhesive at least partially melts in response to the heat source. Once solidified, the adhesive can couple the roof attachment assembly 80 to the roof membrane 16. Other suitable attachment methods are possible, such as welding, gluing, adhering, bonding and the like, and the present method is given by way of example only.

In some embodiments, the first membrane 82 is adhered to the roof membrane 16 to couple the roof attachment assembly 80 to the roof 10. In other embodiments, the first membrane 82 and the second membrane 86 are adhered to the plate 84 and these elements are adhered to the plate 92 and to the roof membrane 16 to couple the roof attachment assembly 80 to the roof 10. In other embodiments, the bracket 88 is adhered to the second membrane 86, the first membrane 82 is adhered to the plate 84, and the first membrane 82 is adhered to the plate 92 and to the roof membrane 16 to couple the roof attachment assembly 80 to the roof 10. In yet other embodiments, both the plate 92 and the first membrane 82 are adhered to the roof membrane 16 to couple the roof attachment assembly 80 to the roof 10. In the last embodiment, the plate 92 may not include fasteners.

FIGS. 16-22 illustrate another construction of a roofing system 110 including a metal roof deck 112, a roof substrate 114 (e.g., insulation, tarpaper, plywood or other decking material, and the like) supported on the roof deck 112, a membrane 116 extending across the substrate 114 (i.e., placed immediately adjacent an upper surface of the substrate 114 or supported on one or more intermediate layers of roofing or sealing material, which in turn are placed on the substrate 114). The roofing system 110 can be utilized on any of a variety of roof types, such as slate roofs, membrane roofs, aluminum roofs, standing seam roofs, tile roofs, shingle roofs, and the like. The roofing system 110 possesses all characteristics of the previously described roofing systems 10.

The roofing system 110 is operable to support any of a variety of roof-mounted fixtures, such as, for example, snow fences, solar panels, conduit for solar panels, cables for lighting rods, an antenna, signs, billboards, or any of a number of other roof-mountable assemblies. Depending on one or more of the geographic location, anticipated quantity and type of precipitation, and anticipated roof and wind loading, the roofing system 110 can include any of a variety of flashing, seal and plate arrangements, as will be discussed below.

Figure 12:
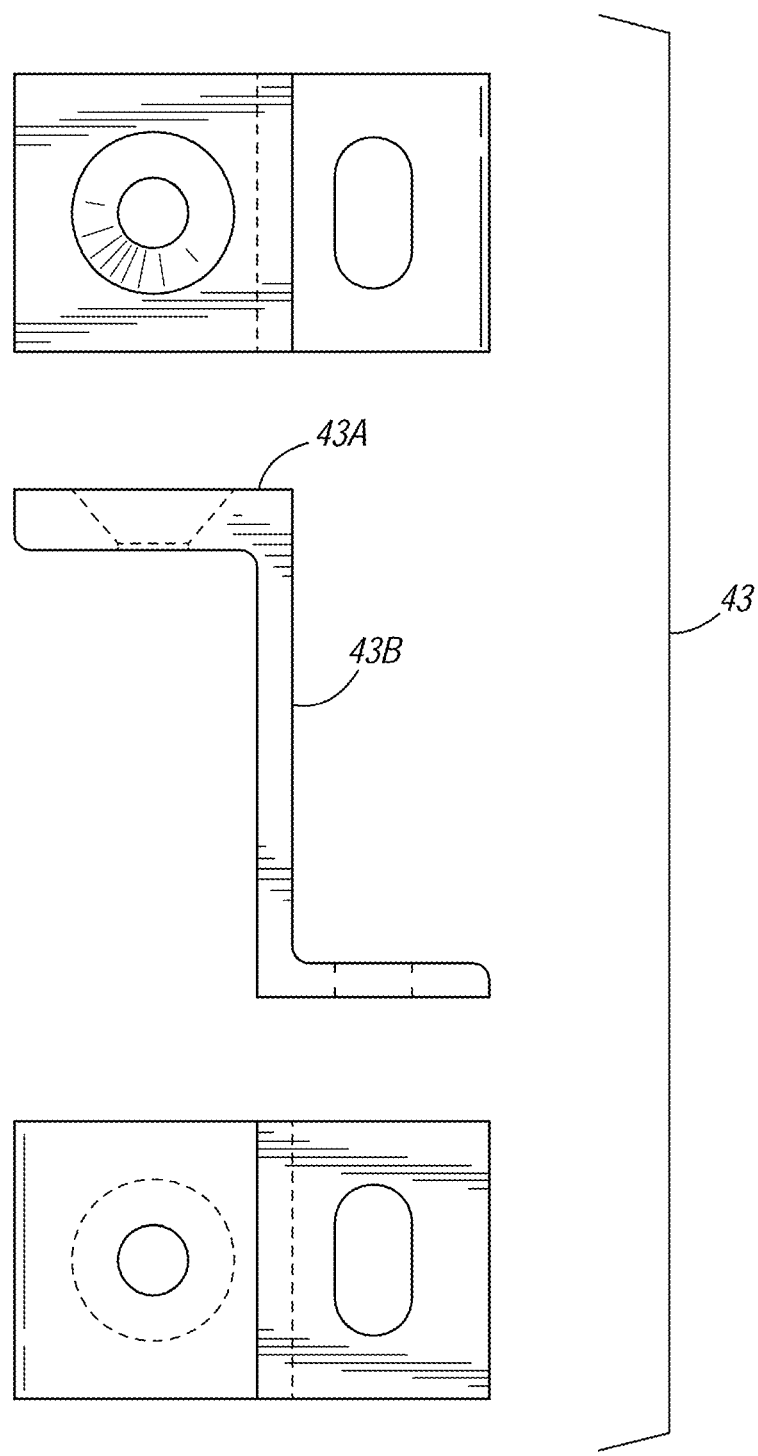
FIGS. 12-14 illustrate various brackets useable with the roofing system and the roof attachment assembly.
Figure 13:
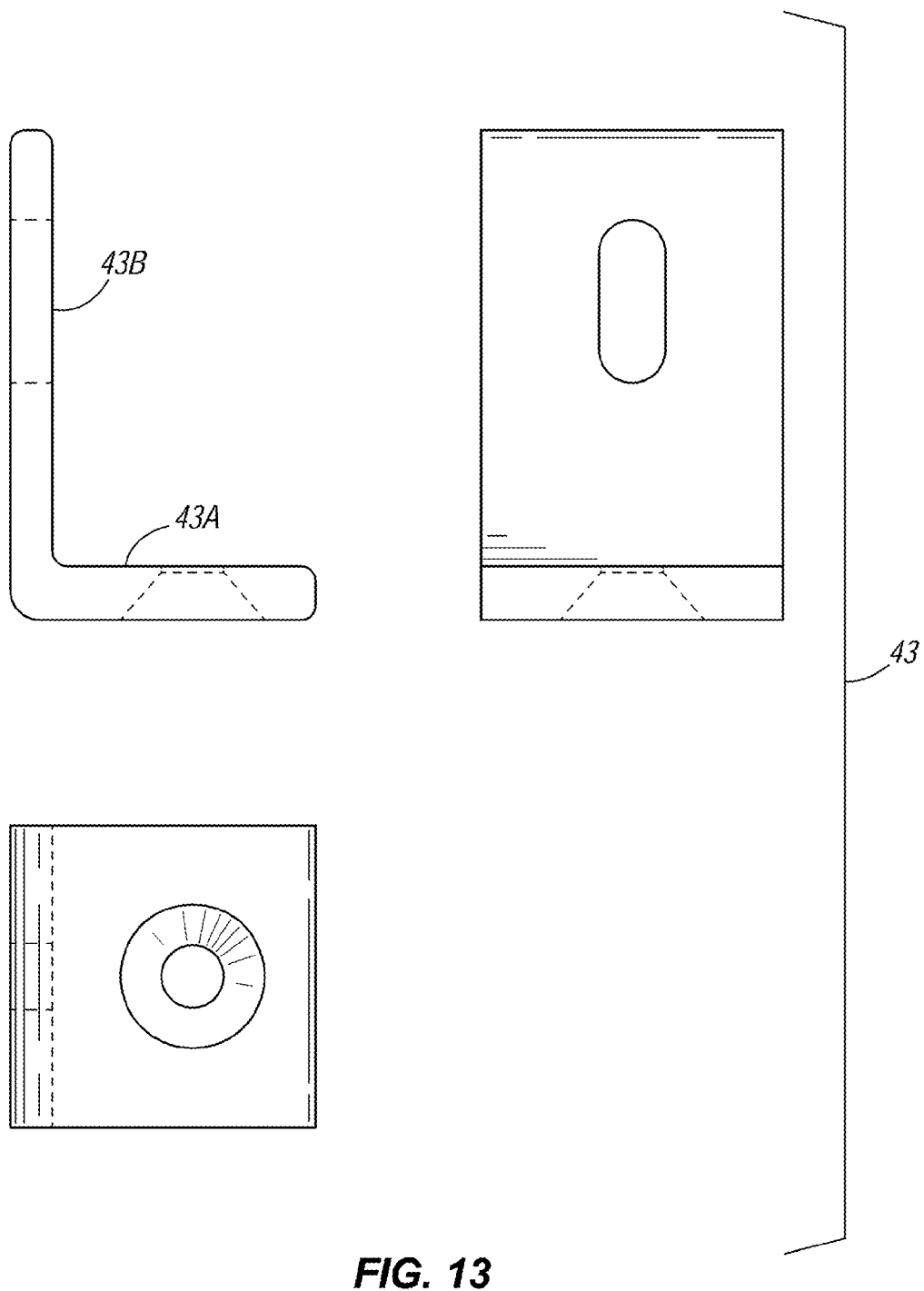

A roof attachment assembly 118 can be coupled to the roofing system 110 with few or no fasteners extending through the membrane 116. One such roof attachment assembly 118 is illustrated in FIGS. 12-14. The illustrated roof attachment assembly 118 includes a plate (also called a base member) 120 having an upwardly extending fastener 122, a membrane pad 124, a compression washer 126 having a substantially frustoconical aperture or a pocket 128, a spacer 130, a flashing 132 and a hose clamp 134.

The roof attachment assembly 118 can be coupled to the roofing system 110 with any suitable non-penetrating fastening method, such as welding, adhering, gluing, bonding, and the like. The roof attachment assembly 118 is operable to support any of a variety of roof-mounted fixtures, such as described above for the roof attachment assembly 18. Although the illustrated roof attachment assembly 118 is substantially square, other shapes are possible. For example, the roof attachment assembly 118 can be round, ovular, rectangular, triangular, pentagonal or other regular or non-regular shape.

Figure 16:
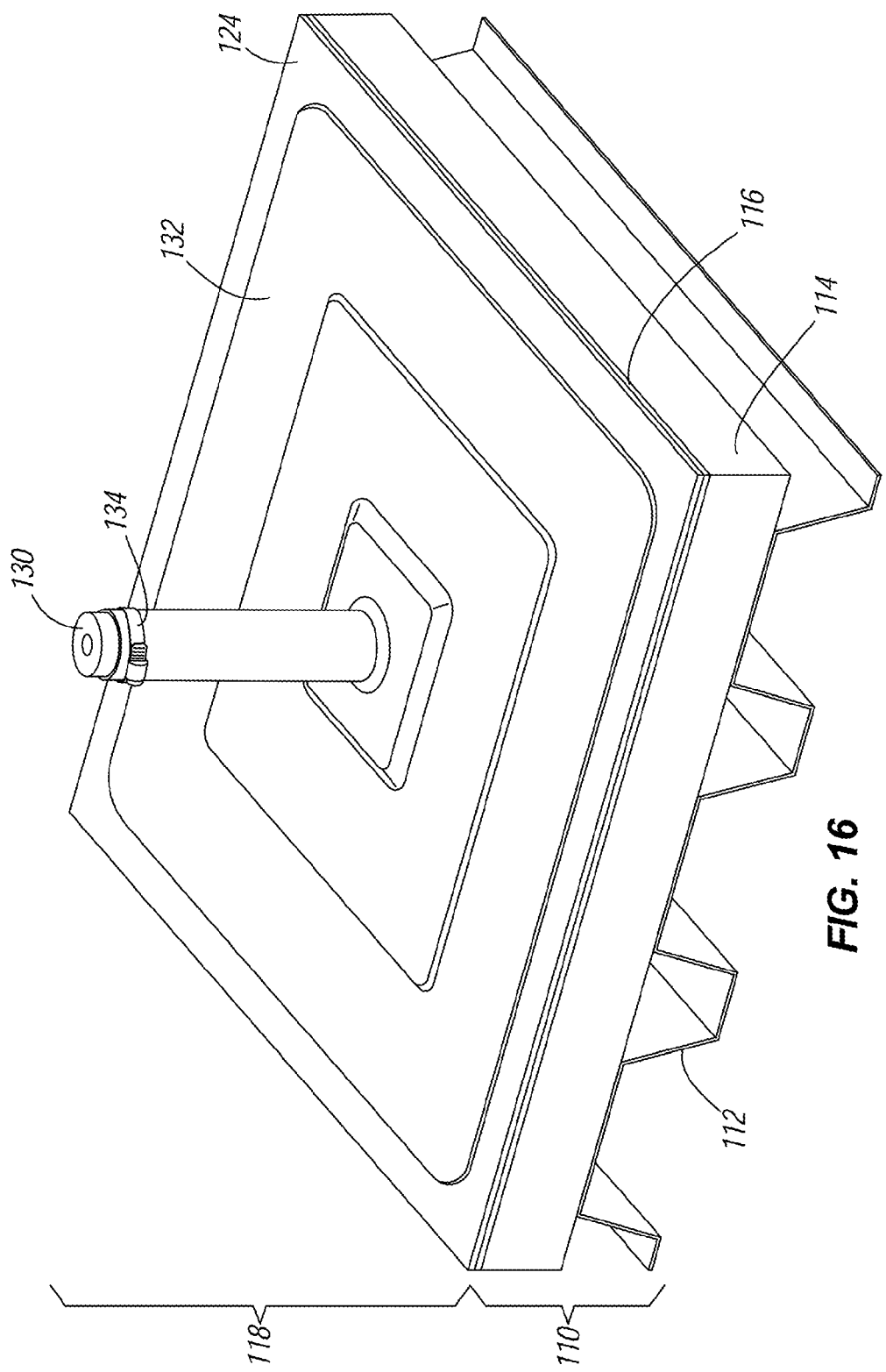
FIGS. 16-18 illustrate an alternative embodiment of a roofing system and a roof attachment assembly according to an embodiment of the present invention.
Figure 17:
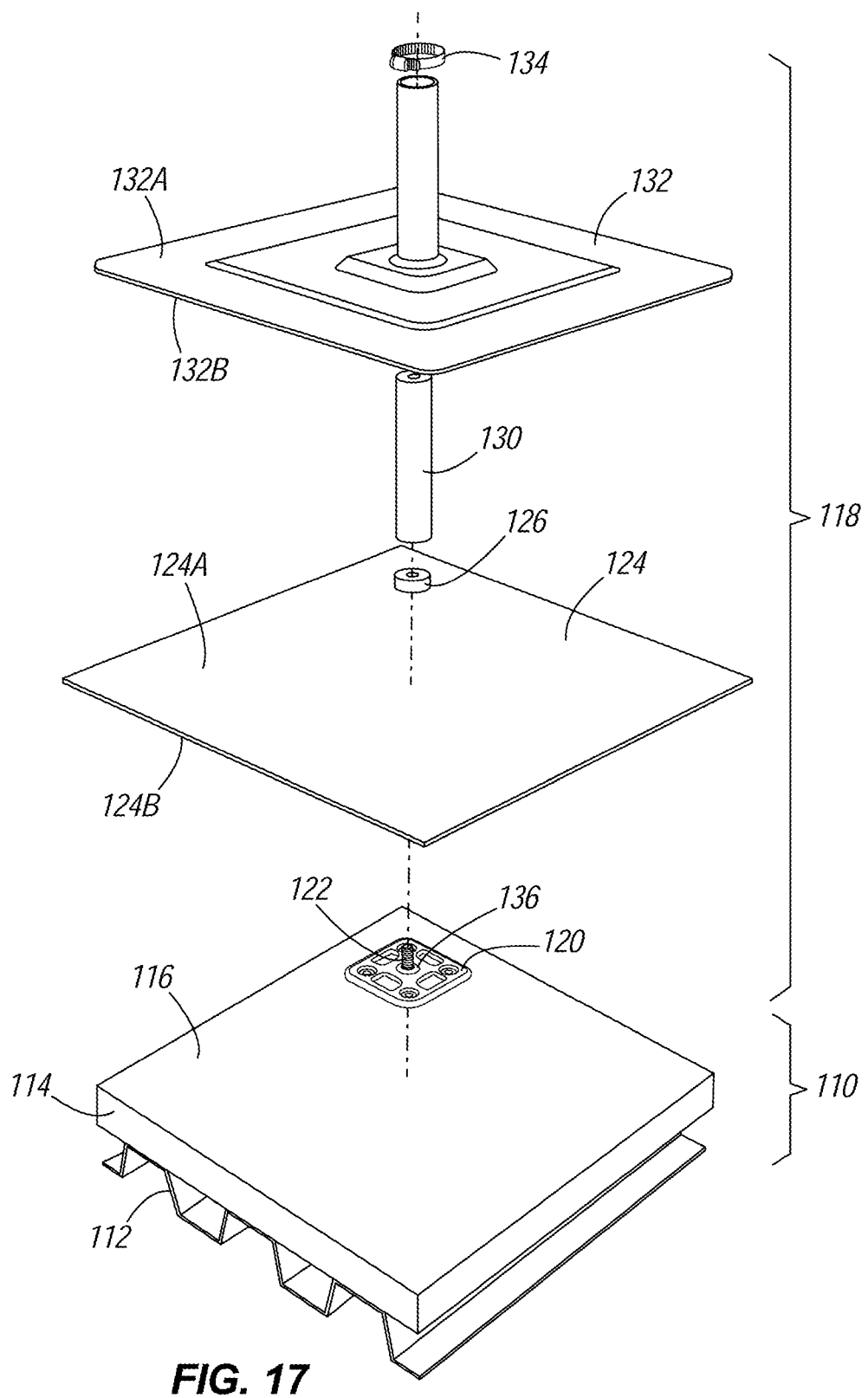
Figure 18:
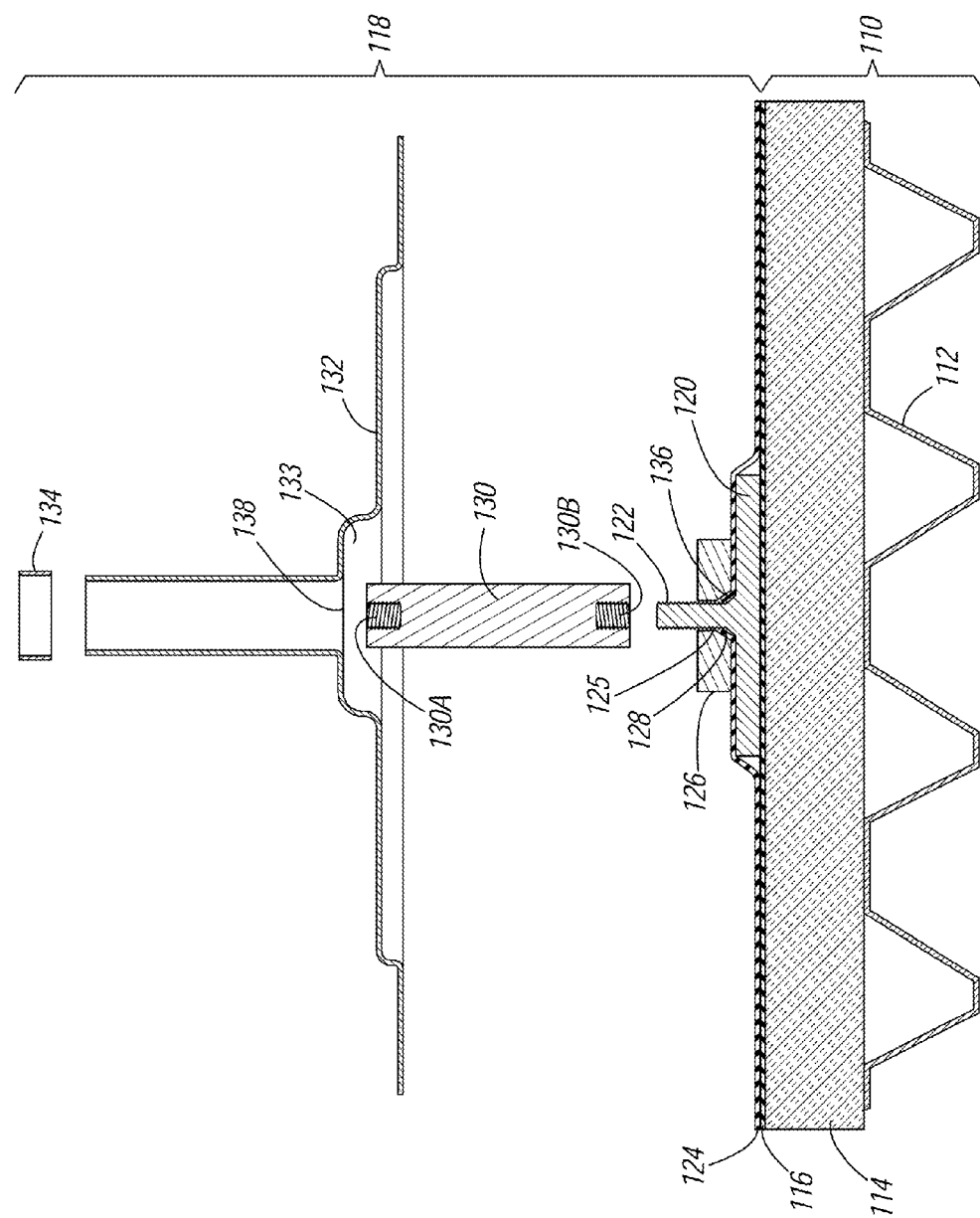
Figure 19:
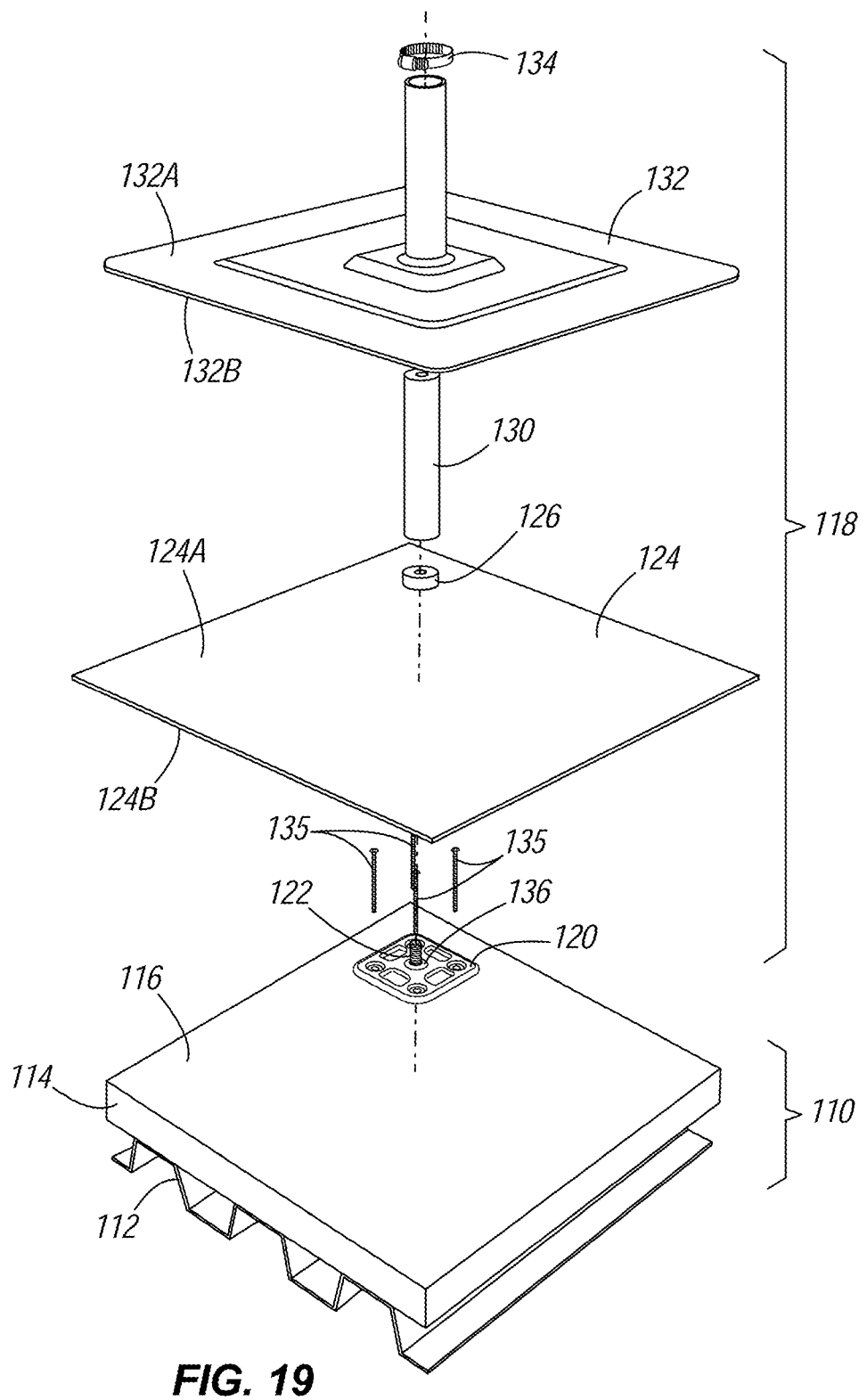
FIGS. 19 and 20 illustrates a further alternative embodiment of a roofing system and a roof attachment assembly according to an embodiment of the present invention.
Figure 20:
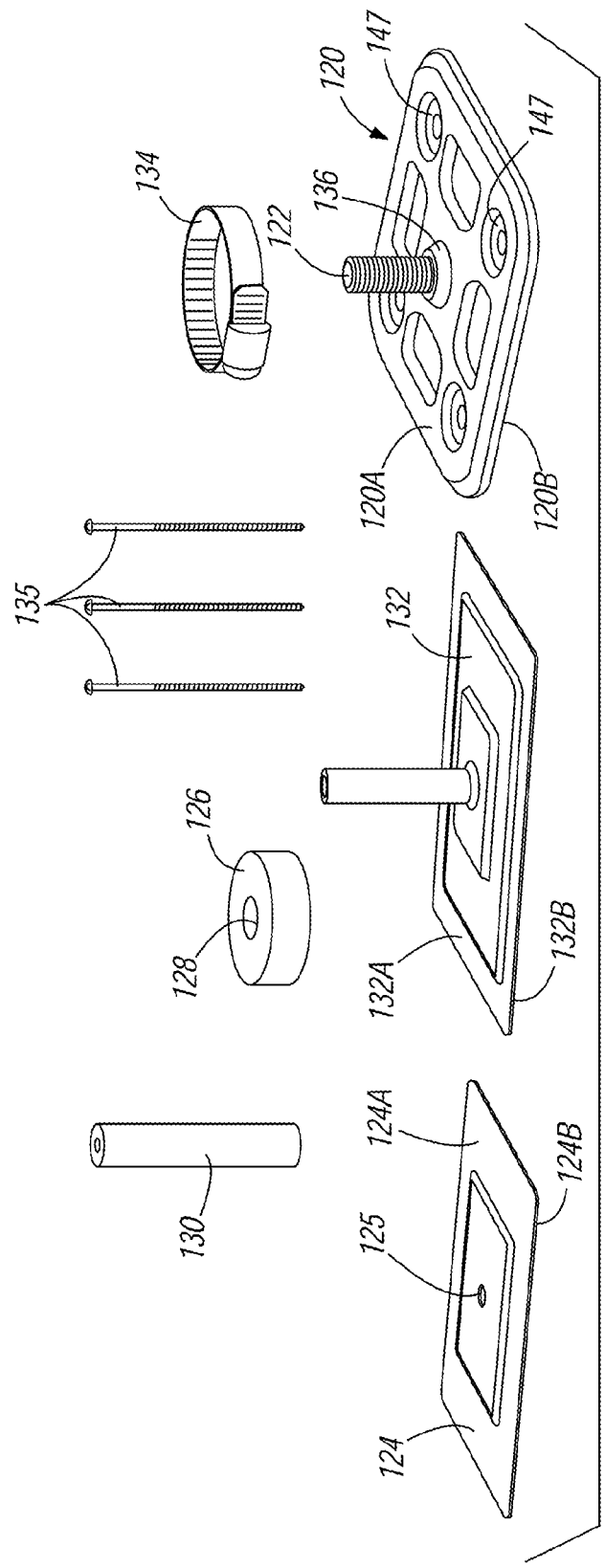

FIGS. 16-18 illustrate an embodiment of the roof attachment assembly 118 in which the plate 120 is connected to the roofing system 110 by a non-penetrating fastening method. Alternatively, FIGS. 19 and 20 illustrate an embodiment of the roof attachment assembly 118 in which the plate 120 is connected to the roofing system 110 by fasteners 135 that penetrate the roofing system 110. The membrane 124 acts as a target patch over the fasteners 135. The roof attachment assembly 118 is considered to not penetrate the roofing system 110, because the membrane pad 124 (or target patch) is connected to the roofing system 110 by welding, adhesive or by some other non-penetrating manor to suitably inhibit or prevent any leakage through the penetrations caused by the fasteners 135.

Figure 21:
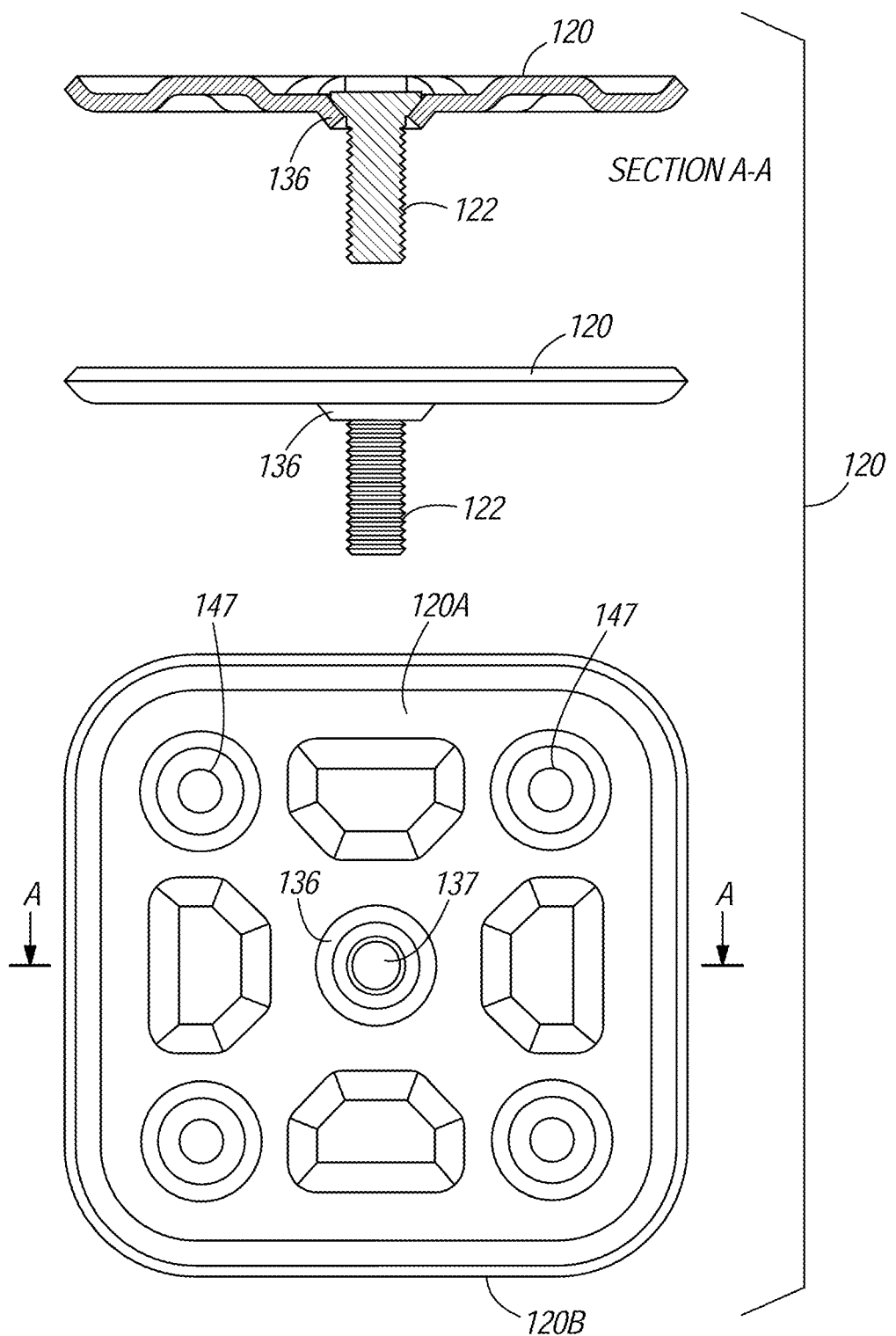
FIG. 21 illustrates a plate useable with the roofing system and the roof attachment assembly of FIGS. 16-20.

FIG. 21 illustrates the plate 120 and the fastener 122 in a greater detail. The plate 120 of the roof attachment assembly 118 can include a substantially frustoconical protrusion 136 defining an aperture 137. In some embodiments, the plate 120 can include one or more stiffening ribs or flanges to increase rigidity. Other type of plates can be utilized in place of plate 120 and the roof attachment assembly 118 can include more than one plate 120. The plate 120 has a top surface 120A facing the membrane pad 124 and a bottom surface 120B facing the roof membrane 116. In some embodiments, the top surface 120A and/or the bottom surface 120B is coated with a material similar to the roof material, such as a membranous material. Embodiments in which both the top surface 120A and the bottom surface 120B are coated can omit the membrane pad 124. In one embodiment, the plate 120 is coupled to the roof by any non-penetrating fastening method, such as welding, adhering, gluing, bonding, and the like. In other embodiments, the plate 120 can be coupled to the roof by using fasteners 135.

The plate 120 includes a plurality of openings 147 extending from the top surface 120A through the bottom surface 120B. The openings 147 are configured to accept the fasteners 135 (e.g., bolts, screws, etc.) that couple the plate 120 to the roof substrate 114 of the roofing system 110. In other embodiments, the plate 120 does not use fasteners 135, but is coupled to the roof substrate 116 via other suitable non-penetrating methods or mechanisms (e.g., via adhesive, heat welding, forging, etc.).

As shown in FIGS. 16-20, the fastener 122 extends through the frustoconical protrusion 136 and the aperture 137 of the plate 120. The frustoconical protrusion 136 extends at least partially into the frustoconical aperture 128 of the washer 126. The washer 126 can be circular, square, ovular, pentagonal or any other suitable size and shape. In some embodiments, the washer 126 can be omitted. In the illustrated embodiment, the plate 120 and the upwardly extending fastener 122 are formed as a single unitary piece. In some embodiments, the plate 120 and the upwardly extending fastener 122 are formed as separate pieces and joined during installation.

As discussed above, any of the plates discussed herein and described above can be utilized in place of the plate 120. The plates are coupled to the roof by any non-penetrating fastening method, such as welding, adhering, gluing, bonding, and the like. Further, the plates can each include a coating on either or both of a top surface and a bottom surface of the plate.

In some embodiments, the plate 120 is coupled to the roof membrane 116 by any suitable non-penetrating method, and then the membrane pad 124 is coupled to the plate 120. In other embodiments, the plate 120 is coupled to the membrane pad 124 to form a single unit, and the single unit is coupled to the roof membrane 116 by any suitable non-penetrating method.

The membrane 124 has a substantially rectangular form, but other shapes of the membrane 124 are also possible. The membrane 124 is positioned adjacent to the top surface 120A of the plate 120, and defines an aperture 125 that substantially aligns with the aperture 137 of the plate 120 and the frustoconical aperture 128 of the washer 126. The membrane 124 defines a top surface 124A and a bottom surface 124B. In other embodiments, the membrane 124 may be constructed without the aperture 125.

The flashing 132 is positioned adjacent to the top surface 124A of the membrane 124. The illustrated flashing 132 comprises metal, but in other embodiments, other material(s) can also be used to construct the flashing 132. The flashing 132 can include a coating on top surface 132A and/or a bottom surface 132B. In embodiments that include a coating on the bottom surface 132B, the coating can be adhered or otherwise coupled to the membrane 116, and the membrane 124 can be omitted. In embodiments that omit the membrane pad 124, the flashing 132 is directly connected to the membrane 116. In some such embodiments, the flashing 132 can include an adhesive, such as double-sided tape, on the bottom surface 132B.

The flashing 132 defines a projection area 133 that is configured to accept at least a portion of the frustoconical protrusion 136 and the washer 126. The flashing 132 further defines a flashing aperture 138 that substantially aligns with the aperture 125 of the membrane 124, the aperture 137 of the plate 120, and the frustoconical aperture 128 of the washer 126. The flashing aperture 138 has a diameter that is larger than the diameter of apertures 125, 137, and 125, such that it allows the spacer 130 to pass through the aperture 138.

Figure 22:
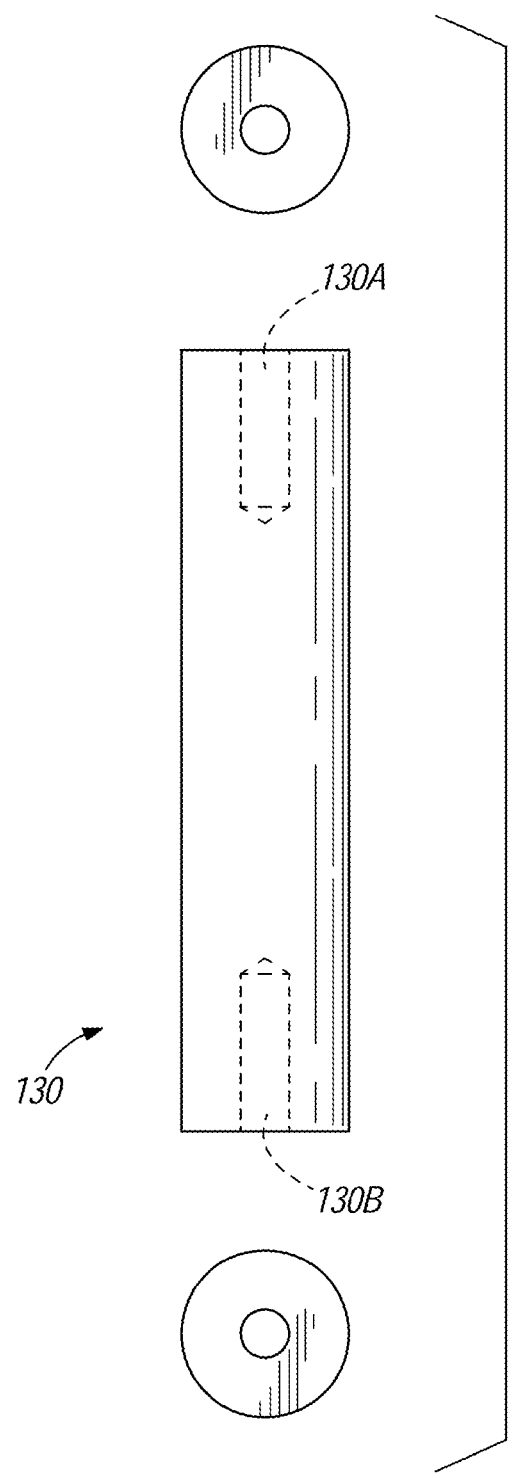
FIG. 22 illustrates a spacer useable with the roofing system and the roof attachment assembly of FIGS. 16-20.

In the illustrated embodiment, the perimeters of the membrane 124 and the pipe flashing 132 are substantially equal, and both perimeters are larger than the perimeter of the plate 120. In other embodiment, these elements of the roof attachment assembly 118 can have different perimeters. The fastener 122 extends through the aperture 137 of the frustoconical protrusion 136, the frustoconical aperture 128 of the washer 126, and engages the spacer 130. As shown in FIG. 22, the spacer 130 includes a top aperture 130A and a bottom aperture 130B that are configured to accept a fastener (e.g., fastener 122). The spacer 130 extends through the aperture 138 of the flashing 132. In other embodiments, other fastening apparatuses and methods, or combinations of fastening apparatuses are utilized in place of washer 126, spacer 130, flashing 132 and hose clamp 134.

One suitable non-penetrating fastening method includes providing an adhesive on any of the roof membrane 116, the plate 120, the membrane 124 and the flashing 132. In some embodiments, one or more of the roof membrane 116, the plate 120, the membrane 124 and the flashing 132 comprises a meltable material that can be construed as an adhesive. In other embodiments, a separate adhesive is applied to the top 120A and/or the bottom 120B of the plate 120. The roof attachment assembly 118 is positioned on the roof membrane 116, and is then heated by a heat source, such as by an induction coil. The adhesive at least partially melts in response to the heat source. Once solidified, the adhesive can couple the roof attachment assembly 118 to the roof membrane 116. Other suitable attachment methods are possible, such as welding, gluing, adhering, bonding and the like, and the present method is given by way of example only.

In some embodiments, the membrane 124 is adhered to the roof membrane 116 to couple the roof attachment assembly 118 to the roof 110. In other embodiments, the plate 120 is adhered to the roof membrane 116 to couple the roof attachment assembly 118 to the roof 110. In some embodiments, the membrane 124 is adhered to the plate 120 and the plate 120 is adhered to the roof membrane 116 to couple the roof attachment assembly 118 to the roof 110. In other embodiments, the membrane 124 is adhered to the plate 120, and the membrane 124 is adhered to the roof membrane 116 to couple the roof attachment assembly 118 to the roof 110. In yet other embodiments, both the plate 120 and the membrane 124 are adhered to the roof membrane 116 to couple the roof attachment assembly 118 to the roof 110.

What is claimed is:

1. A roof attachment assembly for mounting to a roof substrate, the roof attachment assembly comprising:
a plate having a first aperture extending through a substantially central portion of the plate, the plate defining a first surface and a second surface, the first surface facing the roof substrate and the second surface spaced from the roof substrate, the plate defining a plane along which a portion of the plate extends, the plate defining at least one protrusion extending above the plane with respect to the roof substrate, the protrusion positioned between the central aperture and a perimeter of the plate, the plate defining a second aperture extending through a portion of the plate that extends along the plane radially outward from the first aperture;

a first elastomeric membrane positioned adjacent the first surface of the plate;

a second elastomeric membrane positioned adjacent the second surface of the plate;

an attachment member positioned proximate the second surface of the plate, the attachment member operable to support one or more roof mounted fixtures;

a first fastener having a head end adjacent the roof substrate and a threaded end spaced from the roof surface, the first fastener extending through the attachment member, the second elastomeric membrane and the first aperture of the plate, the fastener operable to couple the attachment member, the second elastomeric membrane and the plate together, wherein the roof substrate is contiguous adjacent to the head end of the first fastener; and a second fastener extending through the second aperture of the plate and into the roof substrate, the second fastener operable to couple the plate to the roof substrate, wherein an end at the outermost perimeter of the plate is in direct contact with the first elastomeric membrane.

2. The roof attachment assembly of claim 1, wherein the plate includes a frustoconical protrusion and wherein the attachment member defines a frustoconical pocket sized to receive a portion of the frustoconical protrusion and compress a portion of the second elastomeric membrane between the attachment member and the plate.

3. The roof attachment assembly of claim 1, wherein the plate includes a frustoconical protrusion and wherein the attachment member defines a frustoconical aperture sized to receive a portion of the frustoconical protrusion and compress a portion of the second elastomeric membrane between the attachment member and the plate.

4. The roof attachment assembly of claim 1, wherein the plate and the fastener are a single monolithic component.

5. The roof attachment assembly of claim 1, wherein the plate and the fastener are connected to prevent rotation of the fastener with respect to the plate.

6. The roof attachment assembly of claim 3, wherein the frustoconical protrusion substantially matches a head shape of the fastener.

7. The roof attachment assembly of claim 1, wherein the first surface and the second surface of the plate are coated with a membranous material.

8. The roof attachment assembly of claim 1, wherein a diameter surface area of at least one of the first elastomeric membrane and the second elastomeric membrane is larger than a diameter surface area of the plate.

9. A roof attachment assembly to be mounted on a roof substrate, the roof attachment assembly comprising:

a first elastomeric membrane supportable on the roof substrate;

a base member that defines a first surface positioned substantially adjacent the first elastomeric membrane and a second surface spaced from the roof substrate and the first elastomeric membrane, the base member defining a surface area, the base member including a frustoconical protrusion extending away from the roof substrate along an axis, the first surface forms a frustoconical recess and the second surface forms the frustoconical protrusion, the base member defines a first aperture extending along the axis from the first surface to the second surface, the first aperture substantially centrally positioned in the frustoconical protrusion;

a second elastomeric membrane coupled to the first elastomeric membrane and coupled to the base member, the second elastomeric membrane positioned substantially adjacent the base member second surface, the second elastomeric membrane defining a surface area, wherein the second elastomeric membrane surface area is greater than the surface area of the base member, the second elastomeric membrane being deformable to substantially conform to the frustoconical protrusion of the base member, the second elastomeric membrane defining a second aperture extending therethrough, the second aperture being substantially aligned with the first aperture, such that the second aperture extends along the axis; and a fastener oriented along the axis and having a head end adjacent the roof substrate and a threaded end spaced from the roof substrate, the fastener extending through the first aperture and the second aperture to couple the base member to the second elastomeric membrane, wherein an end at the outermost perimeter of the base member is in direct contact with the first elastomeric membrane.

10. The roof attachment assembly of claim 9, wherein the base member is coupled to the roof substrate by at least one second fastener.

11. A roof attachment assembly to be mounted on a roof substrate, the roof attachment assembly comprising:

a first elastomeric membrane supportable on the roof substrate;

a base member supportable on the first elastomeric membrane, the base member defines a first surface positioned substantially adjacent the first elastomeric membrane and facing the roof substrate and a second surface spaced from the roof substrate, the base member defining a surface area, the base member including a frustoconical protrusion extending away from the roof substrate along an axis, the first surface forms a frustoconical recess and the second surface forms the frustoconical protrusion, the base member defines a first aperture extending along the axis from the first surface to the second surface, the first aperture substantially centrally positioned in the frustoconical protrusion;

a second elastomeric membrane positioned substantially adjacent the base member second surface, the second elastomeric membrane defining a surface area, wherein the second membrane surface area is greater than the surface area of the base member, the second elastomeric membrane being deformable to substantially conform to the frustoconical protrusion of the base member, the second elastomeric membrane defining a second aperture extending therethrough, the second aperture being substantially aligned with the first aperture, such that the second aperture extends along the axis; and a fastener oriented along the axis and having a head end adjacent the roof substrate and a threaded end spaced from the roof substrate, the fastener extending through the first aperture and the second aperture to couple the base member to the second elastomeric membrane, wherein the roof substrate is contiguous adjacent to the head end of the fastener, wherein an end at the outermost perimeter of the base member is in direct contact with the first elastomeric membrane.

12. The roof attachment assembly of claim 11, wherein the base member is coupled to the roof substrate by at least one second fastener.

13. A roof attachment assembly to be mounted on a roof substrate, the roof attachment assembly comprising:
- a first elastomeric membrane supportable on the roof substrate;
- a base member that defines a first surface positioned substantially adjacent the first elastomeric membrane and a second surface spaced from the roof substrate and the first elastomeric membrane, the base member defining a surface area, the base member including a frustoconical protrusion extending away from the roof substrate along an axis, the first surface forms a frustoconical recess and the second surface forms the frustoconical protrusion, the base member defines a first aperture extending along the axis from the first surface to the second surface, the first aperture substantially centrally positioned in the frustoconical protrusion;
- a second elastomeric membrane coupled to the first elastomeric membrane and coupled to the base member, the second elastomeric membrane positioned substantially adjacent the base member second surface, the second elastomeric membrane defining a surface area, wherein the second elastomeric membrane surface area is greater than the surface area of the base member, the second elastomeric membrane being deformable to substantially conform to the frustoconical protrusion of the base member, the second elastomeric membrane defining a second aperture extending therethrough, the second aperture being substantially aligned with the first aperture, such that the second aperture extends along the axis;
- a bracket coupled to the second elastomeric membrane, the bracket defining a first surface spaced from the second elastomeric membrane and a second surface positioned substantially adjacent the second elastomeric membrane, the bracket defining an aperture extending from the first surface to the second surface, the bracket is operable to support a roof-mounted assembly, the bracket aperture being substantially aligned with the first aperture and the second aperture, such that the bracket aperture extends along the axis; and
- a fastener oriented along the axis and having a head end adjacent the roof substrate and a threaded end spaced from the roof substrate, the fastener extending through the first aperture, the second aperture and the bracket aperture to couple the base member to the second elastomeric membrane and to the bracket,
- wherein an end at the outermost perimeter of the base member is in direct contact with the first elastomeric membrane.

14. The roof attachment assembly of claim 13, wherein the base member is coupled to the roof substrate by at least one second fastener.

15. The roof attachment assembly of claim 13, wherein the frustoconical protrusion extends at least partially into the bracket aperture, and the second elastomeric membrane is deformed by the frustoconical protrusion, such that the second elastomeric membrane extends into the bracket aperture.

16. The roof attachment assembly of claim 13, wherein the fastener is configured to accept a compression fitting, and wherein the fastener defines an attachment point exposed for mechanical fastening.

17. A roof attachment assembly to be mounted on a membrane roof, the roof attachment assembly comprising:
- a plate defining an aperture extending through a substantially central portion of the plate, a first surface and a second surface, the first surface facing the membrane roof and the second surface spaced from the membrane roof, the plate defining a plane along which a portion of the plate extends, the plate defining at least one protrusion extending above the plane with respect to the roof substrate, the protrusion positioned between the central aperture and a perimeter of the plate, the plate defining a second aperture extending through a portion of the plate that extends along the plane radially outward from the first aperture;
- a first elastomeric membrane positioned adjacent to the first surface of the first plate;
- a second elastomeric membrane positioned adjacent to the second surface of the plate and substantially shrouding the plate;
- an attachment member positioned proximate to the second elastomeric membrane, the attachment member defining a recess aligned with an aperture of the plate, the attachment member operable to support one or more roof mounted fixtures; and
- a fastener that substantially mates with the recess of the attachment member,
- wherein the fastener is oriented along the axis and has a head end adjacent the membrane roof and a threaded end spaced from the membrane roof, the fastener extending through the plate, the second elastomeric membrane and the attachment member to couple the plate to the second elastomeric membrane and to the attachment member, and
- wherein an end at the outermost perimeter of the plate is in direct contact with the first elastomeric membrane.

18. The roof attachment assembly of claim 17, wherein a perimeter defined by the first elastomeric membrane is substantially larger than a perimeter defined by the second elastomeric membrane and the plate.

19. The roof attachment assembly of claim 17, wherein a portion of the second elastomeric membrane is configured to substantially conform to a shape of the plate, when the plate is compressed between the first elastomeric membrane and the second elastomeric membrane.

20. The roof attachment assembly of claim 17, wherein the membrane roof is contiguous adjacent to the head end of the fastener.

* * * * *